US012334607B2

(12) United States Patent
Davis et al.

(10) Patent No.: US 12,334,607 B2
(45) Date of Patent: Jun. 17, 2025

(54) FUEL CELL ASSEMBLY WITH EXTERNAL MANIFOLD FOR PARALLEL FLOW

(71) Applicants: ExxonMobil Technology and Engineering Company, Annandale, NJ (US); FUELCELL ENERGY, INC., Danbury, CT (US)

(72) Inventors: Keith E. Davis, Southbury, CT (US); Lawrence J. Novacco, Brookfiled, CT (US); Lu Han, Beaumont, TX (US); Brandon J. O'Neill, Lebanon, NJ (US); Frank Hershkowitz, Basking Ridge, NJ (US); Rodrigo F. Blanco Gutierrez, Berkeley Heights, NJ (US); Yesim Igci, Mountainside, NJ (US)

(73) Assignees: ExxonMobil Technology and Engineering Company, Annandale, NJ (US); FUELCELL ENERGY, INC., Danbury, CT (US)

( * ) Notice: Subject to any disclaimer, the term of this patent is extended or adjusted under 35 U.S.C. 154(b) by 98 days.

(21) Appl. No.: 16/695,362

(22) Filed: Nov. 26, 2019

(65) Prior Publication Data

US 2021/0159523 A1   May 27, 2021

(51) Int. Cl.
*H01M 8/04276*   (2016.01)
(52) U.S. Cl.
CPC ............................... *H01M 8/04276* (2013.01)
(58) Field of Classification Search
None
See application file for complete search history.

(56) References Cited

U.S. PATENT DOCUMENTS

| 3,615,839 A | 10/1971 | Thompson et al. |
| 3,970,474 A | 7/1976 | Anbar et al. |
| 4,041,210 A | 8/1977 | Van Dine |

(Continued)

FOREIGN PATENT DOCUMENTS

| AU | 2014235193 B2 | 8/2017 |
| CA | 2120858 A1 | 10/1994 |

(Continued)

OTHER PUBLICATIONS

"Heat of Combustion", Wikipedia, Retrieved from Internet URL : http://en.wikipediaorg/wiki/Lower_heating_value, accessed on Jun. 24, 2014, pp. 8.

(Continued)

*Primary Examiner* — Michael L Dignan
(74) *Attorney, Agent, or Firm* — Shook Hardy & Bacon L.L.P.

(57) ABSTRACT

A fuel cell is provided including an anode configured to receive, and allow to pass through, an anode process gas, a cathode configured to receive, and allow to pass through, a cathode process gas, and an electrolyte matrix layer separating the anode and the cathode. One of the anode or the cathode has an extended edge seal chamber, and the fuel cell is configured to receive the anode process gas and the cathode process gas in substantially perpendicular directions relative to each other, and the extended edge seal chamber is configured to allow the anode process gas and the cathode process gas to pass through the anode and the cathode in substantially parallel flow paths.

10 Claims, 5 Drawing Sheets

(56) References Cited

U.S. PATENT DOCUMENTS

| | | |
|---|---|---|
| 4,160,663 A | 7/1979 | Hsieh |
| 4,389,467 A | 6/1983 | Singh et al. |
| 4,449,994 A | 5/1984 | Hegarty et al. |
| 4,476,633 A | 10/1984 | Brych |
| 4,476,683 A | 10/1984 | Shah et al. |
| 4,532,192 A | 7/1985 | Baker et al. |
| 4,567,117 A | 1/1986 | Patel et al. |
| 4,702,973 A | 10/1987 | Marianowski |
| 4,732,577 A | 3/1988 | Koizumi et al. |
| 4,772,634 A | 9/1988 | Farooque |
| 4,800,052 A | 1/1989 | Swarr et al. |
| 4,810,595 A | 3/1989 | Kahara et al. |
| 4,828,940 A | 5/1989 | Cohen et al. |
| 4,917,971 A | 4/1990 | Farooque |
| 4,921,765 A | 5/1990 | Gmeindl et al. |
| 4,925,745 A | 5/1990 | Remick et al. |
| 4,983,472 A | 1/1991 | Katz et al. |
| 4,995,807 A | 2/1991 | Rampley et al. |
| 5,039,579 A | 8/1991 | Kinoshita |
| 5,071,719 A | 12/1991 | Rostrup-Nielsen et al. |
| 5,079,103 A | 1/1992 | Schramm |
| 5,082,752 A | 1/1992 | Koga et al. |
| 5,084,362 A | 1/1992 | Farooque |
| 5,100,743 A | 3/1992 | Narita et al. |
| 5,134,043 A | 7/1992 | Nakazawa |
| 5,169,717 A | 12/1992 | Topsoe |
| 5,198,311 A | 3/1993 | Nakazawa et al. |
| 5,208,113 A | 5/1993 | Kinoshita |
| 5,232,793 A | 8/1993 | Miyauchi et al. |
| 5,376,472 A | 12/1994 | Hartvigsen et al. |
| 5,380,600 A | 1/1995 | Hansen et al. |
| 5,413,878 A | 5/1995 | Williams et al. |
| 5,417,051 A | 5/1995 | Ankersmit et al. |
| 5,422,195 A | 6/1995 | Bernard |
| 5,468,573 A | 11/1995 | Bregoli et al. |
| 5,470,670 A | 11/1995 | Yasumoto et al. |
| 5,518,827 A | 5/1996 | Matsumura et al. |
| 5,518,828 A | 5/1996 | Senetar |
| 5,541,014 A | 7/1996 | Micheli et al. |
| 5,554,453 A | 9/1996 | Steinfeld et al. |
| 5,616,430 A | 4/1997 | Aoyama |
| 5,660,941 A | 8/1997 | Farooque et al. |
| 5,688,292 A | 11/1997 | Antolini |
| 5,736,026 A | 4/1998 | Patel et al. |
| 5,833,734 A | 11/1998 | Cip et al. |
| 6,030,718 A | 2/2000 | Fuglevand et al. |
| 6,063,141 A | 5/2000 | Wendt et al. |
| 6,063,515 A | 5/2000 | Epp et al. |
| 6,083,636 A | 7/2000 | Hsu |
| 6,090,312 A | 7/2000 | Ziaka et al. |
| 6,126,718 A | 10/2000 | Sawa et al. |
| 6,162,556 A | 12/2000 | Vollmar et al. |
| 6,267,799 B1 | 7/2001 | Innes et al. |
| 6,280,865 B1 | 8/2001 | Eisman et al. |
| 6,322,916 B1 | 11/2001 | Hemmes et al. |
| 6,365,290 B1 | 4/2002 | Ghezel-Ayagh et al. |
| 6,383,251 B1 | 5/2002 | Sherwood |
| 6,383,677 B1 | 5/2002 | Allen |
| 6,420,062 B1 | 7/2002 | Prohaska et al. |
| 6,492,045 B1 | 12/2002 | Blanchet et al. |
| 6,509,113 B2 | 1/2003 | Keegan |
| 6,517,963 B2 | 2/2003 | Lakshmanan et al. |
| 6,524,356 B2 | 2/2003 | Fournier et al. |
| 6,648,942 B2 | 11/2003 | Hoffman et al. |
| 6,660,069 B2 | 12/2003 | Sato et al. |
| 6,821,664 B2 | 11/2004 | Parks et al. |
| 6,833,207 B2 | 12/2004 | Joos et al. |
| 6,866,950 B2 | 3/2005 | Connor et al. |
| 6,887,601 B2 | 5/2005 | Moulthrop, Jr. et al. |
| 6,896,988 B2 | 5/2005 | Wang et al. |
| 6,924,053 B2 | 8/2005 | McElroy |
| 6,994,929 B2 | 2/2006 | Barbir et al. |
| 7,011,903 B2 | 3/2006 | Benson et al. |
| 7,014,940 B2 | 3/2006 | Hase et al. |
| 7,041,272 B2 | 5/2006 | Keefer et al. |
| 7,045,233 B2 | 5/2006 | McElroy et al. |
| 7,097,925 B2 | 8/2006 | Keefer |
| 7,132,182 B2 | 11/2006 | McElroy et al. |
| 7,141,323 B2 | 11/2006 | Ballantine et al. |
| 7,255,949 B2 | 8/2007 | Coors et al. |
| 7,276,306 B2 | 10/2007 | Pham et al. |
| 7,285,350 B2 | 10/2007 | Keefer et al. |
| 7,311,986 B2 | 12/2007 | Hsu |
| 7,396,603 B2 | 7/2008 | Farooque et al. |
| 7,416,800 B2 | 8/2008 | Benson et al. |
| 7,482,078 B2 | 1/2009 | Sridhar et al. |
| 7,503,178 B2 | 3/2009 | Bucker et al. |
| 7,520,916 B2 | 4/2009 | McElroy et al. |
| 7,563,527 B2 | 7/2009 | Tanaka et al. |
| 7,591,880 B2 | 9/2009 | Levan et al. |
| 7,601,207 B2 | 10/2009 | Moulthrop et al. |
| 7,604,684 B2 | 10/2009 | Menzel |
| 7,674,539 B2 | 3/2010 | Keefer et al. |
| 7,691,507 B2 | 4/2010 | Ballantine et al. |
| 7,740,988 B2 * | 6/2010 | Ma .................... H01M 8/0271 |
| | | 429/514 |
| 7,752,848 B2 | 7/2010 | Balan et al. |
| 7,833,668 B2 | 11/2010 | Ballantine et al. |
| 7,846,599 B2 | 12/2010 | Ballantine et al. |
| 7,855,028 B2 | 12/2010 | Ryu et al. |
| 7,862,938 B2 | 1/2011 | Ghezel-Ayagh |
| 7,883,803 B2 | 2/2011 | McElroy et al. |
| 7,914,765 B2 | 3/2011 | McLean et al. |
| 7,939,219 B2 | 5/2011 | Johnsen et al. |
| 7,968,237 B2 | 6/2011 | Grieve et al. |
| 8,047,007 B2 | 11/2011 | Zubrin et al. |
| 8,062,799 B2 | 11/2011 | Jahnke et al. |
| 8,071,241 B2 | 12/2011 | Sridhar et al. |
| 8,080,344 B2 | 12/2011 | Skok et al. |
| 8,101,307 B2 | 1/2012 | McElroy et al. |
| 8,142,943 B2 | 3/2012 | McElroy et al. |
| 8,158,290 B2 | 4/2012 | Penev et al. |
| 8,241,400 B2 | 8/2012 | Grover |
| 8,293,412 B2 | 10/2012 | McElroy |
| 8,343,671 B2 | 1/2013 | Qi |
| 8,349,504 B1 | 1/2013 | Radovich |
| 8,512,901 B2 | 8/2013 | Kusnezoff et al. |
| 8,530,101 B2 | 9/2013 | Qi |
| 8,557,468 B2 | 10/2013 | Hilmi et al. |
| 8,562,903 B2 | 10/2013 | Hayton et al. |
| 8,790,618 B2 | 7/2014 | Adams et al. |
| 8,802,332 B2 | 8/2014 | Correa et al. |
| 8,815,462 B2 | 8/2014 | Ghezel-Ayagh et al. |
| 8,822,090 B2 | 9/2014 | Ma et al. |
| 8,882,865 B2 | 11/2014 | Johnston |
| 9,077,006 B2 | 7/2015 | Berlowitz et al. |
| 9,077,007 B2 | 7/2015 | Berlowitz et al. |
| 9,315,397 B2 | 4/2016 | Sivret |
| 9,365,131 B2 | 6/2016 | Jamal et al. |
| 9,455,458 B2 | 9/2016 | Yu et al. |
| 9,455,463 B2 | 9/2016 | Berlowitz et al. |
| 9,499,403 B2 | 11/2016 | Al-Muhaish et al. |
| 9,502,728 B1 | 11/2016 | Farooque et al. |
| 9,520,607 B2 | 12/2016 | Berlowitz et al. |
| 9,531,024 B2 | 12/2016 | Pollica et al. |
| 9,586,171 B2 | 3/2017 | Vanzandt et al. |
| 9,861,931 B2 | 1/2018 | Kuopanportti et al. |
| 10,093,997 B2 | 10/2018 | Berlowitz et al. |
| 10,673,084 B2 | 6/2020 | Ghezel-Ayagh |
| 11,211,621 B2 | 12/2021 | Barckholtz et al. |
| 11,335,937 B2 | 5/2022 | Rosen et al. |
| 11,424,469 B2 | 8/2022 | Rosen et al. |
| 11,476,486 B2 | 10/2022 | Blanco et al. |
| 11,616,248 B2 | 3/2023 | Rosen et al. |
| 11,664,519 B2 | 5/2023 | Davis et al. |
| 11,695,122 B2 | 7/2023 | Hilmi et al. |
| 2002/0106549 A1 | 8/2002 | Cooper et al. |
| 2002/0114989 A1 | 8/2002 | Allen |
| 2002/0142198 A1 | 10/2002 | Towler et al. |
| 2002/0142208 A1 | 10/2002 | Keefer et al. |
| 2002/0164522 A1 | 11/2002 | Huang et al. |
| 2003/0008183 A1 | 1/2003 | Hsu |
| 2003/0013448 A1 | 1/2003 | Dillinger et al. |
| 2003/0096155 A1 | 5/2003 | Hong et al. |

(56) References Cited

U.S. PATENT DOCUMENTS

| | | |
|---|---|---|
| 2003/0143448 A1 | 7/2003 | Keefer |
| 2003/0157383 A1 | 8/2003 | Takahashi |
| 2003/0207161 A1 | 11/2003 | Rusta-Sallehy et al. |
| 2003/0219637 A1 | 11/2003 | Coors |
| 2004/0028979 A1 | 2/2004 | Ballantine et al. |
| 2004/0038089 A1 | 2/2004 | Hoffjann et al. |
| 2004/0038115 A1 | 2/2004 | Johnsen et al. |
| 2004/0043274 A1 | 3/2004 | Scartozzi et al. |
| 2004/0146760 A1 | 7/2004 | Miwa |
| 2004/0166384 A1 | 8/2004 | Schafer |
| 2004/0170882 A1 | 9/2004 | Ohara et al. |
| 2004/0197612 A1 | 10/2004 | Keefer et al. |
| 2004/0202914 A1 | 10/2004 | Sridhar et al. |
| 2004/0221578 A1 | 11/2004 | Iijima et al. |
| 2004/0229102 A1 | 11/2004 | Jahnke et al. |
| 2005/0003247 A1 | 1/2005 | Pham et al. |
| 2005/0074657 A1 | 4/2005 | Rusta-Sallehy et al. |
| 2005/0079395 A1 | 4/2005 | Varatharajan et al. |
| 2005/0098034 A1 | 5/2005 | Gittleman et al. |
| 2005/0103827 A1 | 5/2005 | Twigg |
| 2005/0106429 A1 | 5/2005 | Keefer |
| 2005/0112425 A1 | 5/2005 | Hsu |
| 2005/0123810 A1 | 6/2005 | Balan |
| 2005/0164051 A1 | 7/2005 | Venkataraman et al. |
| 2005/0181247 A1 | 8/2005 | Foger et al. |
| 2005/0227137 A1 | 10/2005 | Suga |
| 2005/0233188 A1 | 10/2005 | Kurashima et al. |
| 2006/0115691 A1 | 6/2006 | Hilmen et al. |
| 2006/0123705 A1* | 6/2006 | Ma .................... H01M 8/04014 |
| | | 429/454 |
| 2006/0127718 A1 | 6/2006 | Kurashima et al. |
| 2006/0159967 A1 | 7/2006 | Huijsmans et al. |
| 2006/0188761 A1 | 8/2006 | O'Brien et al. |
| 2006/0204806 A1 | 9/2006 | Takada et al. |
| 2006/0251940 A1 | 11/2006 | Bandhauer et al. |
| 2006/0257722 A1 | 11/2006 | Hilmi et al. |
| 2006/0269830 A1 | 11/2006 | Johnsen et al. |
| 2007/0009774 A1 | 1/2007 | Clawson et al. |
| 2007/0017367 A1 | 1/2007 | McElroy et al. |
| 2007/0031718 A1 | 2/2007 | Fujimura et al. |
| 2007/0044657 A1 | 3/2007 | LaVen et al. |
| 2007/0065688 A1 | 3/2007 | Shimazu et al. |
| 2007/0072027 A1 | 3/2007 | Sridhar et al. |
| 2007/0099038 A1 | 5/2007 | Galloway |
| 2007/0111054 A1 | 5/2007 | Gottmann et al. |
| 2007/0141409 A1 | 6/2007 | Cho et al. |
| 2007/0178338 A1 | 8/2007 | McElroy et al. |
| 2007/0184310 A1* | 8/2007 | Kim .................... H01M 8/2485 |
| | | 429/444 |
| 2007/0190395 A1 | 8/2007 | Ryu et al. |
| 2007/0193885 A1 | 8/2007 | Benicewicz et al. |
| 2007/0224467 A1 | 9/2007 | Nervi et al. |
| 2007/0231659 A1* | 10/2007 | Ma ........................ H01M 8/026 |
| | | 429/510 |
| 2007/0243475 A1 | 10/2007 | Funada et al. |
| 2007/0246363 A1 | 10/2007 | Eisman et al. |
| 2007/0246374 A1 | 10/2007 | Eisman et al. |
| 2007/0287046 A1 | 12/2007 | Koda et al. |
| 2008/0057361 A1 | 3/2008 | Moon et al. |
| 2008/0063910 A1 | 3/2008 | Okuyama et al. |
| 2008/0124255 A1 | 5/2008 | Johnston |
| 2008/0160358 A1 | 7/2008 | Parodi et al. |
| 2008/0171244 A1 | 7/2008 | Okuyama et al. |
| 2008/0178463 A1 | 7/2008 | Okubora |
| 2008/0241612 A1 | 10/2008 | Ballantine et al. |
| 2008/0241638 A1 | 10/2008 | McElroy et al. |
| 2008/0245101 A1 | 10/2008 | Dubettier-Grenier et al. |
| 2008/0280180 A1 | 11/2008 | Correa et al. |
| 2008/0292921 A1 | 11/2008 | Lakshmanan et al. |
| 2008/0299425 A1 | 12/2008 | Kivisaari et al. |
| 2008/0311445 A1 | 12/2008 | Venkataraman et al. |
| 2009/0029204 A1 | 1/2009 | Venkataraman |
| 2009/0029205 A1 | 1/2009 | Venkataraman et al. |
| 2009/0042070 A1 | 2/2009 | Brown, Jr. et al. |
| 2009/0068512 A1 | 3/2009 | Gofer et al. |
| 2009/0084085 A1 | 4/2009 | Kawai |
| 2009/0155637 A1 | 6/2009 | Cui et al. |
| 2009/0155644 A1 | 6/2009 | Cui et al. |
| 2009/0155645 A1 | 6/2009 | Cui et al. |
| 2009/0155650 A1 | 6/2009 | Cui et al. |
| 2009/0169452 A1 | 7/2009 | Constantz et al. |
| 2009/0186244 A1 | 7/2009 | Mayer |
| 2009/0208784 A1 | 8/2009 | Perry et al. |
| 2009/0317667 A2 | 12/2009 | Nervi et al. |
| 2009/0317669 A1 | 12/2009 | Hildebrandt et al. |
| 2010/0015486 A1 | 1/2010 | Yoshiba |
| 2010/0028730 A1 | 2/2010 | Ghezel-Ayagh et al. |
| 2010/0035109 A1 | 2/2010 | Weingaertner et al. |
| 2010/0047641 A1 | 2/2010 | Jahnke et al. |
| 2010/0104903 A1 | 4/2010 | Gummalla et al. |
| 2010/0126180 A1 | 5/2010 | Forsyth et al. |
| 2010/0148410 A1 | 6/2010 | Bleifuss et al. |
| 2010/0190090 A1* | 7/2010 | Kuno .................. H01M 8/2483 |
| | | 429/495 |
| 2010/0199559 A1 | 8/2010 | Hallett et al. |
| 2010/0221633 A1 | 9/2010 | Fujita et al. |
| 2010/0239924 A1 | 9/2010 | McElroy et al. |
| 2010/0243475 A1 | 9/2010 | Eisman et al. |
| 2010/0248085 A1 | 9/2010 | Chang et al. |
| 2010/0266923 A1 | 10/2010 | McElroy et al. |
| 2010/0279181 A1 | 11/2010 | Adams, II et al. |
| 2011/0033771 A1 | 2/2011 | Bednarz et al. |
| 2011/0104577 A1 | 5/2011 | Cui et al. |
| 2011/0111315 A1 | 5/2011 | Cui et al. |
| 2011/0117460 A1 | 5/2011 | Shin |
| 2011/0154951 A1 | 6/2011 | Hiraoka |
| 2011/0167821 A1 | 7/2011 | Baker et al. |
| 2011/0171544 A1 | 7/2011 | Burmeister et al. |
| 2011/0223500 A1 | 9/2011 | Uematsu et al. |
| 2011/0223501 A1 | 9/2011 | Uematsu et al. |
| 2012/0000243 A1 | 1/2012 | Bough et al. |
| 2012/0028145 A1 | 2/2012 | Boden et al. |
| 2012/0034538 A1 | 2/2012 | Jahnke et al. |
| 2012/0058042 A1 | 3/2012 | Zauderer |
| 2012/0167620 A1 | 7/2012 | Van Dorst et al. |
| 2012/0171588 A1 | 7/2012 | Fan et al. |
| 2012/0189922 A1 | 7/2012 | Schmidt et al. |
| 2012/0214076 A1 | 8/2012 | Hakala |
| 2012/0251898 A1 | 10/2012 | Lehar et al. |
| 2012/0291483 A1 | 11/2012 | Terrien et al. |
| 2012/0295180 A1* | 11/2012 | Homma ............... H01M 8/2432 |
| | | 429/456 |
| 2012/0325053 A1 | 12/2012 | Grossi |
| 2013/0014484 A1 | 1/2013 | Caprile et al. |
| 2013/0081516 A1 | 4/2013 | Simmons |
| 2013/0111948 A1 | 5/2013 | Higginbotham |
| 2013/0126038 A1 | 5/2013 | Jamal et al. |
| 2013/0177824 A1 | 7/2013 | Cui et al. |
| 2013/0209904 A1 | 8/2013 | Liu et al. |
| 2013/0259780 A1 | 10/2013 | Handagama et al. |
| 2013/0337360 A1 | 12/2013 | Mahoney et al. |
| 2014/0242482 A1 | 8/2014 | Cui et al. |
| 2014/0260310 A1 | 9/2014 | Berlowitz et al. |
| 2014/0272613 A1 | 9/2014 | Berlowitz et al. |
| 2014/0272616 A1 | 9/2014 | Berlowitz et al. |
| 2014/0272641 A1 | 9/2014 | Berlowitz et al. |
| 2014/0302413 A1 | 10/2014 | Berlowitz et al. |
| 2014/0326300 A1 | 11/2014 | Fuhrmann |
| 2014/0329160 A1 | 11/2014 | Ramaswamy et al. |
| 2014/0352309 A1 | 12/2014 | Kim et al. |
| 2015/0089951 A1 | 4/2015 | Barckholtz et al. |
| 2015/0093665 A1 | 4/2015 | Barckholtz et al. |
| 2015/0111160 A1 | 4/2015 | Brunhuber et al. |
| 2015/0122122 A1 | 5/2015 | W Mustapa et al. |
| 2015/0191351 A1 | 7/2015 | Darde et al. |
| 2015/0263364 A1 | 9/2015 | Berlowitz et al. |
| 2015/0266393 A1 | 9/2015 | Jamal et al. |
| 2015/0280265 A1 | 10/2015 | McLarty |
| 2015/0321914 A1 | 11/2015 | Darde et al. |
| 2015/0340723 A1* | 11/2015 | Yang .................. H01M 8/2483 |
| | | 429/514 |
| 2016/0168470 A1 | 6/2016 | Gillespie et al. |
| 2016/0190604 A1 | 6/2016 | Evans et al. |
| 2016/0190613 A1 | 6/2016 | Shiokawa et al. |

(56) References Cited

U.S. PATENT DOCUMENTS

| | | | |
|---|---|---|---|
| 2016/0248110 A1 | 8/2016 | Ghezel-Ayagh | |
| 2016/0265122 A1 | 9/2016 | Zhu et al. | |
| 2016/0351930 A1 | 12/2016 | Jahnke et al. | |
| 2016/0365590 A1 | 12/2016 | Zheng et al. | |
| 2016/0365594 A1 | 12/2016 | Zheng et al. | |
| 2017/0040620 A1* | 2/2017 | Uwani | H01M 8/2483 |
| 2017/0130582 A1 | 5/2017 | Hsu | |
| 2017/0141421 A1 | 5/2017 | Sundaram et al. | |
| 2017/0191139 A1 | 7/2017 | Berlowitz et al. | |
| 2017/0250429 A1 | 8/2017 | Diethelm et al. | |
| 2017/0271701 A1 | 9/2017 | Berlowitz et al. | |
| 2017/0271707 A1 | 9/2017 | Sasakawa et al. | |
| 2018/0034089 A1 | 2/2018 | Berlowitz et al. | |
| 2019/0051919 A1* | 2/2019 | Yoshizaki | H01M 8/2432 |
| 2019/0115610 A1 | 4/2019 | Quatannens et al. | |
| 2019/0131636 A1* | 5/2019 | Lösche-ter Horst | H01M 8/2432 |
| 2019/0190053 A1 | 6/2019 | Ballantine et al. | |
| 2019/0198904 A1 | 6/2019 | Ichikawa et al. | |
| 2019/0326614 A1 | 10/2019 | Hood et al. | |
| 2019/0386317 A1 | 12/2019 | Poizeau et al. | |
| 2020/0020965 A1 | 1/2020 | Wang et al. | |
| 2020/0099066 A1* | 3/2020 | Ghezel-Ayagh | H01M 8/0215 |
| 2020/0176783 A1 | 6/2020 | Rosen et al. | |
| 2020/0176787 A1 | 6/2020 | Geary et al. | |
| 2020/0176789 A1 | 6/2020 | Hilmi et al. | |
| 2020/0176793 A1 | 6/2020 | Barckholtz et al. | |
| 2020/0176795 A1 | 6/2020 | Johnson | |
| 2020/0176799 A1 | 6/2020 | Blanco et al. | |
| 2020/0176800 A1 | 6/2020 | O'Neal et al. | |
| 2020/0307997 A1 | 10/2020 | Tranier | |

FOREIGN PATENT DOCUMENTS

| | | |
|---|---|---|
| CA | 2325072 A1 | 4/2002 |
| CA | 2551219 A1 | 1/2007 |
| CA | 2694153 A1 | 9/2011 |
| CA | 2902861 A1 | 9/2014 |
| CA | 2956439 C | 4/2017 |
| CN | 2120858 U | 11/1992 |
| CN | 1520624 A | 8/2004 |
| CN | 101098022 A | 1/2008 |
| CN | 101285004 A | 10/2008 |
| CN | 101808723 A | 8/2010 |
| CN | 101809396 A | 8/2010 |
| CN | 101821891 A | 9/2010 |
| CN | 201902241 U | 7/2011 |
| CN | 102422108 A | 4/2012 |
| CN | 101796680 B | 10/2013 |
| CN | 104847424 A | 8/2015 |
| CN | 105050945 A | 11/2015 |
| CN | 105594049 A | 5/2016 |
| CN | 107251297 A | 10/2017 |
| CN | 207542331 U | 6/2018 |
| DE | 40 05 468 A1 | 8/1991 |
| DE | 19515669 A1 | 10/1996 |
| DE | 19545186 A1 | 6/1997 |
| DE | 196 09 313 C1 | 9/1997 |
| DE | 199 41 724 A1 | 8/2000 |
| DE | 100 16 847 A1 | 10/2001 |
| DE | 10 2006 047 823 A1 | 2/2008 |
| DE | 10 2008 019 981 A1 | 10/2009 |
| EP | 0 170 277 A2 | 2/1986 |
| EP | 0 180 941 A2 | 5/1986 |
| EP | 0 473 153 A2 | 3/1992 |
| EP | 0 502 125 A1 | 9/1992 |
| EP | 0 678 926 A1 | 10/1995 |
| EP | 0 685 897 A1 | 12/1995 |
| EP | 0 691 701 A1 | 1/1996 |
| EP | 1 306 916 A1 | 5/2003 |
| EP | 1 670 090 A1 | 6/2006 |
| EP | 1 790 027 A2 | 5/2007 |
| EP | 1 926 171 A1 | 5/2008 |
| EP | 2 182 572 A1 | 5/2010 |
| EP | 2 589 902 A2 | 5/2013 |
| EP | 2 589 908 A2 | 5/2013 |
| EP | 2 991 139 A1 | 3/2016 |
| EP | 1 841 515 B1 | 6/2016 |
| EP | 2 011 183 B1 | 6/2016 |
| EP | 1 996 533 B1 | 7/2016 |
| EP | 1 273 061 B1 | 8/2016 |
| EP | 1 344 270 B1 | 6/2017 |
| EP | 3 360 189 A1 | 8/2018 |
| IT | 102009901749803 A1 | 1/2011 |
| JP | S56-69775 A | 6/1981 |
| JP | S58-093170 A | 6/1983 |
| JP | 62-208557 A | 9/1987 |
| JP | S62-241524 A | 10/1987 |
| JP | H02-075164 A | 3/1990 |
| JP | H02-281569 A | 11/1990 |
| JP | H03-001447 A | 1/1991 |
| JP | H03-210774 A | 9/1991 |
| JP | H04-039868 A | 2/1992 |
| JP | H04-334870 A | 11/1992 |
| JP | H05-029009 A | 2/1993 |
| JP | 105-503606 A | 6/1993 |
| JP | H05-163180 A | 6/1993 |
| JP | H05-325996 A | 12/1993 |
| JP | H06-196184 A | 7/1994 |
| JP | 07-220749 A | 8/1995 |
| JP | H07201349 A | 8/1995 |
| JP | 07-249420 A | 9/1995 |
| JP | H07-302604 A | 11/1995 |
| JP | 108-96824 A | 4/1996 |
| JP | H08-138701 A | 5/1996 |
| JP | H10-172595 A | 6/1998 |
| JP | H11-91427 A | 4/1999 |
| JP | H11-312527 A | 11/1999 |
| JP | 2001023670 A | 1/2001 |
| JP | 2002-075164 A | 3/2002 |
| JP | 2002-151111 A | 5/2002 |
| JP | 2002-319428 A | 10/2002 |
| JP | 2002334714 A | 11/2002 |
| JP | 2003-001447 A | 1/2003 |
| JP | 2004-014124 A | 1/2004 |
| JP | 2004-039868 A | 2/2004 |
| JP | 2004-079495 A | 3/2004 |
| JP | 2004171802 A | 6/2004 |
| JP | 2004-186074 A | 7/2004 |
| JP | 2004-523086 A | 7/2004 |
| JP | 2005-029009 A | 2/2005 |
| JP | 2005-163180 A | 6/2005 |
| JP | 2005-190981 A | 7/2005 |
| JP | 2005179083 A | 7/2005 |
| JP | 2006-073316 A | 3/2006 |
| JP | 2006-179233 A | 7/2006 |
| JP | 2006-202570 A | 8/2006 |
| JP | 2007018907 A | 1/2007 |
| JP | 2007-52937 A | 3/2007 |
| JP | 2007-179910 A | 7/2007 |
| JP | 2007-214134 A | 8/2007 |
| JP | 2007-287580 A | 11/2007 |
| JP | 2008-027749 A | 2/2008 |
| JP | 2008507113 A | 3/2008 |
| JP | 2008-527617 A | 7/2008 |
| JP | 2008-192425 A | 8/2008 |
| JP | 2008-287940 A | 11/2008 |
| JP | 2009-503788 A | 1/2009 |
| JP | 2009503790 A | 1/2009 |
| JP | 2009-043487 A | 2/2009 |
| JP | 2009-108241 A | 5/2009 |
| JP | 2010-055927 A | 3/2010 |
| JP | 2010228963 A | 10/2010 |
| JP | 2010-534913 A | 11/2010 |
| JP | 2011141967 A | 7/2011 |
| JP | 2011181440 A | 9/2011 |
| JP | 2011-207741 A | 10/2011 |
| JP | 2012519649 A | 8/2012 |
| JP | 2012531719 A | 12/2012 |
| JP | 2013-045535 A1 | 3/2013 |
| JP | 5893170 B2 | 3/2016 |
| JP | 2016-511525 A | 4/2016 |
| JP | 2016-115479 A | 6/2016 |

(56) References Cited

FOREIGN PATENT DOCUMENTS

| | | |
|---|---|---|
| JP | 2016-517616 A | 6/2016 |
| JP | 2016-532243 A | 10/2016 |
| JP | 2018-521464 A | 8/2018 |
| JP | 2019-508860 A | 3/2019 |
| JP | 2023-503952 A | 2/2023 |
| JP | 7286769 B2 | 6/2023 |
| KR | 10-2006-0014327 A | 2/2006 |
| KR | 2006-0057023 A | 5/2006 |
| KR | 10-0651270 B1 | 11/2006 |
| KR | 10-2008-0016858 A | 2/2008 |
| KR | 10-2008-0017402 A | 2/2008 |
| KR | 10-0827954 B1 | 5/2008 |
| KR | 2009-0067426 A | 6/2009 |
| KR | 2009-0124824 A | 12/2009 |
| KR | 2010-0032974 A | 3/2010 |
| KR | 10-2010-0039422 A | 4/2010 |
| KR | 2011-0029963 A | 3/2011 |
| KR | 2011-0032443 A | 3/2011 |
| KR | 2011-0077775 A | 7/2011 |
| KR | 2012-0050319 A | 5/2012 |
| KR | 20130075492 A | 7/2013 |
| KR | 10-2013-0128116 A | 11/2013 |
| KR | 2014-0085839 A | 7/2014 |
| KR | 2015-0066314 A | 6/2015 |
| KR | 2016-0041309 A | 4/2016 |
| NL | 1008883 C2 | 10/1999 |
| TW | 201036239 A | 10/2010 |
| WO | 91/08595 A1 | 6/1991 |
| WO | 97/21257 A2 | 6/1997 |
| WO | 97/33828 A1 | 9/1997 |
| WO | 00/31815 A1 | 6/2000 |
| WO | 02/069430 A2 | 9/2002 |
| WO | 02/070402 A2 | 9/2002 |
| WO | 2002/103833 A1 | 12/2002 |
| WO | 2003/063276 A2 | 7/2003 |
| WO | 2004/013924 A2 | 2/2004 |
| WO | 2005/001977 A1 | 1/2005 |
| WO | 2006/072262 A1 | 7/2006 |
| WO | 2007/015689 A2 | 2/2007 |
| WO | 2008/036169 A2 | 3/2008 |
| WO | 2009/013455 A2 | 1/2009 |
| WO | 2009/059571 A1 | 5/2009 |
| WO | 2010/044113 A1 | 4/2010 |
| WO | 2010/067223 A1 | 6/2010 |
| WO | 2010/125443 A1 | 11/2010 |
| WO | 2010/147885 A1 | 12/2010 |
| WO | 2010/147886 A1 | 12/2010 |
| WO | 2011/077224 A1 | 6/2011 |
| WO | 2011/089382 A2 | 7/2011 |
| WO | 2011/111553 A1 | 9/2011 |
| WO | 2012/091096 A1 | 7/2012 |
| WO | 2012/128928 A1 | 9/2012 |
| WO | 2012/176176 A1 | 12/2012 |
| WO | 2012/176177 A1 | 12/2012 |
| WO | 2014/151207 A1 | 9/2014 |
| WO | 2015/059507 A1 | 4/2015 |
| WO | 2015/072584 A1 | 5/2015 |
| WO | 2015/116964 A1 | 8/2015 |
| WO | 2015/124183 A1 | 8/2015 |
| WO | 2015/124700 A1 | 8/2015 |
| WO | 2015/133757 A1 | 9/2015 |
| WO | 2016/100849 A1 | 6/2016 |
| WO | 2016/196952 A1 | 12/2016 |
| WO | 2017/160511 A1 | 9/2017 |
| WO | 2017/223218 A1 | 12/2017 |
| WO | 2018/222265 A1 | 12/2018 |
| WO | 2019/175850 A1 | 9/2019 |
| WO | 2021/107929 A1 | 6/2021 |

OTHER PUBLICATIONS

"Lower and Higher Heating Values of Fuels", Hydrogen Data Resource Center: Hydrogen Calculator, p. 1 (2012).

"Molten Carbonate Fuel Cell Technology", Fossil Energy—U.S. Department of Energy, pp. 2 (Jan. 31, 2011).
"Test and Quality Assurance Plan : FuelCell Energy, Inc.—DFC 300A Molten Carbonate Fuel Cell Combined Heat and Power System", Greenhouse Gas Technology Center, pp. 1-42 (Mar. 2007).
Avidan, A. A., "Gasoline and Distillate Fuels from Methanol", Elsevier Science Publishers B.V, pp. 307-323 (1988).
Appleby A. J., and Selman, J. R., "Current Technology of PAFC, MCFC and SOFC Systems: Status of Present Fuel Cell Power Plants", Electrochemical Hydrogen Technologies, pp. 425-495 (Jan. 1, 1990).
Appleby, A. J., "Fuel Cells and Hydrogen Fuel", International Journal of Hydrogen Energy, vol. 19, No. 2, pp. 175-180 (1994).
Amorelli, A., et al., "An experimental investigation into the use of molten carbonate fuel cells to capture $CO_2$ from gas turbine exhaust gases", Second annual conference on Carbon Sequestration, pp. 1-9 (May 5-8, 2003).
Amorelli, A., et al., "An experimental investigation into the use of molten carbonate fuel cells to capture $CO_2$ from gas turbine exhaust gases", Energy, vol. 29, pp. 1279-1284 (2004).
Abu-Zahra, M. R.M, et al., "$CO_2$ capture from power plants: Part I. A parametric study of the technical performance based on monoethanolamine", International Journal of Greenhouse Gas Control, vol. 1, pp. 37-46 (2007).
Appl, M., "Ammonia, 3. Production Plants", Ullmann'S Encyclopedia of Industrial Chemistry, vol. 3, pp. 1-35 (2012).
Bianchi A., et al., "Bimodal Pore Size Distribution in MCFC Cathode Structure", Extended Abstracts, Electrochemical Society, vol. 95/01, pp. 858-859 (May 1995).
Cavallaro, S., et al., "Syngas and electricity production by an integrated autothermal reforming/molten carbonate fuel cell system", Journal of Power Sources, vol. 76, pp. 190-196 (1998).
Chiesa, P., et al., "A Comparative Analysis of IGCCs with $CO_2$ Sequestration", Greenhouse Gas Control Technologies, pp. 107-112 (1999).
Campanari, S., "Carbon Dioxide separation from high temperature fuel cell power plants", Journal of Power Sources, vol. 112, pp. 273-289 (2002).
Campanari, S., et al., "$CO_2$ capture from combined cycles integrated with Molten Carbonate Fuel Cells", International Journal of Greenhouse Gas Control, vol. 4, pp. 441-451 (2010).
Campanari, S., et al., "Application of MCFCs for active $CO_2$ capture within natural gas combined cycles", Energy Procedia, vol. 4, pp. 1235-1242 (2011).
Caprile, L., et al., "Carbon capture: Energy wasting technologies or the MCFCs challenge?", International Journal of Hydrogen Energy, vol. 36, pp. 10269-10277 (2011).
Chiesa, P., et al., "$CO_2$ cryogenic separation from combined cycles integrated with molten carbonate fuel cells", International Journal of Hydrogen Energy, vol. 36, pp. 10355-10365 (2011).
Desideri, U., et al., "MCFC-based $CO_2$ capture system for small scale CHP plants", International Journal of Hydrogen Energy, vol. 37, p. 19295-19303 (2012).
Ghezel-Ayagh, H., "High Efficiency Direct FuelCell/Turbine® Power Plant", Project Fact Sheet, Fuel Cell Energy, pp. 3 (2011).
Ghezel-Ayagh, H., "Electrochemical Membrane for $CO_2$ Capture and Power Generation", Presentation at the 2012 NETL $CO_2$ Capture Technology Meeting, Fuel Cell Energy, pp. 12 (Jul. 9, 2012).
Giddey, S., et al., "A comprehensive review of direct carbon fuel cell technology", Progress in Energy Combustion Science, vol. 38, pp. 360-399 (2012).
Keil, F. J., "Methanol-to-hydrocarbons: process technology", Microporous and Mesoporous Materials, vol. 29, pp. 49-66 (1999).
Kim, D. H., et al., "Numerical studies of a separator for stack temperature control in a molten carbonate fuel cell", International Journal of Hydrogen Energy, vol. 36, pp. 8499-8507 (2011).
Lowe, C., et al., "Technology Assessment of Hydrogen Firing of Process Heaters", Energy Procedia, ScienceDirect, vol. 4, pp. 1058-1065 (2011).
Morita, H., et al., "Degradation Mechanism of Molten Carbonate Fuel Cell Based on Long-Term Performance: Long-Term Operation by Using Bench-Scale Cell and Post-Test Analysis of the Cell", Journal of Power Sources, vol. 195, pp. 6988-6996 (2010).

(56) References Cited

OTHER PUBLICATIONS

Manzolini, G., et al., "CO2 Separation from Combined Cycles Using Molten Carbonate Fuel Cells", Journal of Fuel Cell Science and Technology, vol. 9, pp. 011018-1 to 011018-8 (2012).
Naqvi, S. N., "Dimethyl Ether as Fuel", SRI Consulting Report, Report No. 245A, p. 188 (Sep. 2005).
Pilatowsky, I., et al., "Thermodynamics of Fuel Cells", Cogeneration Fuel Cell-Sorption Air Conditioning Systems, pp. 25-36 (2011).
Sugiura, K., et al., "The carbon dioxide concentrator by using MCFC", Journal of Power Sources, vol. 118, pp. 218-227 (2003).
Steynberg, A., "Gas loop for POX reformers : Figure 8", Studies in Surface Science and Catalysis: Fischer Tropsch Technology, vol. 152, pp. 8 (2004).
Verda, V., and Nicolin, F., "Thermodynamic and economic optimization of a MCFC-based hybrid system for the combined production of electricity and hydrogen", International Journal of Hydrogen Energy, vol. 35, pp. 794-806 (2010).
Wesoff, E., "Will FuelCell Energy Be The First Profitable Company in the Industry?", Greentech Media, pp. 3 (Dec. 15, 2011).
Zhou, W., et al., "Decrease of energy demand for bioethanol-based polygeneration system through case study", Applied Energy, vol. 95, pp. 305-311 (2012).
International Search Report and Written Opinion received for PCT Patent Application No. PCT/US2019/063296, mailed on Feb. 18, 2020, 11 pages.
International Search Report and Written Opinion received for PCT Patent Application No. PCT/US2019/063255, mailed on Mar. 4, 2020, 11 pages.
International Search Report and Written opinion received for PCT Patent Application No. PCT/US2019/063293, mailed on Mar. 13, 2020, 10 pages.
International Search Report and Written Opinion received for PCT Patent Application No. PCT/US2019/063301, mailed on Mar. 13, 2020, 9 pages.
International Search Report and Written Opinion received for PCT Patent Application No. PCT/US2019/063248, mailed on Mar. 13, 2020, 10 pages.
International Search Report and Written Opinion received for PCT Patent Application No. PCT/US2019/063434, mailed on Mar. 24, 2020, 11 pages.
International Search Report and Written Opinion received for PCT Patent Application No. PCT/US2019/063337, mailed on Mar. 31, 2020, 9 pages.
International Search Report and Written Opinion received for PCT Patent Application No. PCT/US2019/063304, mailed on Apr. 1, 2020, 11 pages.
International Search Report and Written Opinion received for PCT Patent Application No. PCT/US2019/063291, mailed on Aug. 18, 2020, 13 pages.
International Search Report and Written Opinion received for PCT Patent Application No. PCT/US2019/063345, mailed on Aug. 20, 2020, 13 pages.
International Search Report and Written Opinion received for PCT Patent Application No. PCT/US2019/063333, mailed on Nov. 25, 2020, 20 pages.
Campanari, S., et al., "Using MCFC for high efficiency CO2 capture from natural gas combined cycles: Comparison of internal and external reforming", Applied Energy, 112, pp. 772-783 (2013).
Non-Final Office Action dated Jun. 16, 2021 in U.S. Appl. No. 16/695,356, 5 pages.
Non-Final Office Action dated Jul. 22, 2021 in U.S. Appl. No. 16/695,368, 8 pages.
Non-Final Office Action dated Aug. 3, 2021 in U.S. Appl. No. 16/695,276, 17 pages.
Non-Final Office Action dated Aug. 10, 2021 in U.S. Appl. No. 16/695,281, 15 pages.
Notice of Allowance dated Aug. 17, 2021 in U.S. Appl. No. 16/695,335, 12 pages.
Final Office Action dated Nov. 15, 2021 in U.S. Appl. No. 16/695,368, 5 pages.
Notice of Allowance dated Nov. 23, 2021 in U.S. Appl. No. 16/695,356, 15 pages.
Final Office Action dated Dec. 21, 2021 in U.S. Appl. No. 16/695,281, 12 pages.
Non-Final Office Action dated Jan. 7, 2022 in U.S. Appl. No. 16/695,286, 6 pages.
Final Office Action dated Jan. 11, 2022 in U.S. Appl. No. 16/695,276, 17 pages.
Non-Final Office Action dated Jan. 20, 2022 in U.S. Appl. No. 16/695,280, 17 pages.
Non-Final Office Action dated Feb. 4, 2022 in U.S. Appl. No. 16/695,278, 18 pages.
Non-Final Office Action dated May 10, 2022 in U.S. Appl. No. 16/696,821, 8 pages.
Notice of Allowance dated Jun. 10, 2022 in U.S. Appl. No. 16/695,286, 11 pages.
Final Office Action dated Jul. 25, 2022 in U.S. Appl. No. 16/695,278, 19 pages.
Final Office Action dated Jul. 27, 2022 in U.S. Appl. No. 16/695,280, 17 pages.
Non-Final Office Action dated Jul. 29, 2022 in U.S. Appl. No. 16/695,281, 14 pages.
Notice of Reasons for Refusal and Search Report received in JP Patent Application No. 2021-531318, mailed on May 31, 2022, 43 pages. [Machine Translation Submitted].
Notice of Reasons for Refusal and Search Report received in JP Patent Application No. 2021-531317, mailed on May 31, 2022, 38 pages. [Machine Translation Submitted].
International Preliminary Report on Patentability received for PCT Application No. PCT/US2019/063291, mailed on Jun. 9, 2022, 8 pages.
International Preliminary Report on Patentability received for PCT Application No. PCT/US2019/063333, mailed on Jun. 9, 2022, 12 pages.
International Preliminary Report on Patentability received for PCT Application No. PCT/US2019/063345, mailed on Jun. 9, 2022, 7 pages.
Notice of Allowance dated Feb. 11, 2022 in U.S. Appl. No. 16/695,368, 7 pages.
Notice of Allowance dated Apr. 19, 2022 in U.S. Appl. No. 16/695,349, 9 pages.
Canadian Office Action received for Canadian Patent Application No. 3,121,537, mailed on Mar. 21, 2022, 4 pages.
Canadian Office Action received for Canadian Patent Application No. 3,121,538, mailed on Mar. 21, 2022, 4 pages.
First Examination Report received for Australian Patent Application No. 2019476316, mailed on Jan. 25, 2023, 2 pages.
Notice of Allowance dated Feb. 1, 2023 in U.S. Appl. No. 16/695,278, 8 pages.
Office Action received for Canadian Patent Application No. 3159772, mailed on Feb. 23, 2023, 3 pages.
Non-Final Office Action dated Apr. 14, 2023 in U.S. Appl. No. 16/695,281, 13 pages.
Notice of Allowance received for Canadian Patent Application No. 3121538, mailed on Mar. 7, 2023, 1 page.
Office Action received for Canadian Patent Application No. 3162231, mailed on Mar. 16, 2023, 3 pages.
Non-Final Office Action dated Apr. 18, 2023 in U.S. Appl. No. 17/677,363, 8 pages.
First Examination Report received for Australian Patent Application No. 2019476660, mailed on Mar. 17, 2023, 3 pages.
First Examination Report received for Australian Patent Application No. 2019476338, mailed on April 14, 2023, 4 pages.
Notice of Allowance dated Sep. 8, 2022 in U.S. Appl. No. 16/695,276, 7 pages.
Notice of Reasons for Refusal received in JP Patent Application No. 2021-531318, mailed on Oct. 4, 2022, 8 pages. (English Translation Submitted).
Decision to Grant received in JP Patent Application No. 2021-531318, mailed on Apr. 25, 2023, 5 pages. (English Translation submitted).

(56) References Cited

OTHER PUBLICATIONS

Office Action and Search Report received for Japanese Patent Application No. 2022-530259, mailed on Jun. 20, 2023, 8 pages. (English translation submitted).
Office Action received for Korean Patent Application No. 10-2021-7020275, mailed on May 18, 2023, 18 pages. (English translation submitted).
Canadian Office Action received for Canadian Patent Application No. 3,162,614, mailed on May 23, 2023, 3 pages.
Office Action received for European Patent Application No. 19827916.8, mailed on May 25, 2023, 5 pages.
Notification of Allowance and Search received for Chinese Patent Application No. 201980087107.5, mailed on May 29, 2023, 7 pages. (English translation submitted).
Notification of Allowance and Search received for Chinese Patent Application No. 201980090518.X, mailed on May 29, 2023, 7 pages. (English translation submitted).
Office Action received in Japanese Patent Application No. 2022-530718 mailed on Jun. 13, 2023, 8 pages. [English Translation submitted].
Search Report received for Japanese Patent Application No. 2022-530259, mailed on May 15, 2023, 23 pages. (English translation submitted).
Office Action received in Korean Patent Application No. 2021-7020267 mailed on Jun. 15, 2023, 14 pages. [English Translation submitted].
Office Action received in Japanese Patent Application No. 2022-530808 mailed on Jun. 20, 2023, 10 pages. [English Translation submitted].
Non-Final Office Action dated May 12, 2023 in U.S. Appl. No. 16/695,280, 16 pages.
Non-Final Office Action dated Jun. 14, 2023 in U.S. Appl. No. 16/695,276, 14 pages.
Decision to Grant received in JP Patent Application No. 2021-531317, mailed on Nov. 29, 2022, 5 pages. (English Translation Submitted).
Canadian Office Action received for Canadian Patent Application No. 3121537, mailed on Jan. 9, 2023, 3 pages.
"20 Mesh T316 Stainless .009" Wire Dia, TWP Inc., accessed at https://www.twpinc.com/20-mesh-t316-stainless-009-wire-dia, accessed on Jan. 4, 2023, 2 pages.
Notice of Allowance dated Oct. 27, 2022 in U.S. Appl. No. 16/696,821, 12 pages.
Notice of Allowance dated Nov. 16, 2022 in U.S. Appl. No. 17/867,324, 8 pages.
Final Office Action dated Jan. 3, 2023 in U.S. Appl. No. 16/695,276, 11 pages.
Notice of Allowance dated Jan. 18, 2023 in U.S. Appl. No. 16/695,368, 7 pages.
Non-Final Office Action dated Jan. 17, 2023 in U.S. Appl. No. 17/941,291, 11 pages.
"PROX", Wikipedia, Retrieved from the Internet : URL : https://en.wikipedia.org/w/index.php? title=PROX&oldid=697317259, accessed on Dec. 20, 2023, pp. 2 (Dec. 29, 2015).
Communication pursuant to Article 94(3) EPC in EP 17786599.5 dated Jan. 30, 2020 (6 pages).
Extended European Search Report and Opinion received for European Patent Application No. 17786599.5, mailed on May 20, 2019, 7 pages.
Extended European Search Report and Opinion received for European Patent Application No. 17786629.0, mailed on Mar. 26, 2019, 9 pages.
Extended European Search Report and Opinion received for European Patent Application No. 17790107.1, mailed on Nov. 29, 2019, 10 pages.
Extended European Search Report and Opinion received for European Patent Application No. 21154960.5, mailed on May 17, 2021, 9 pages.
Final Office Action dated Aug. 18, 2020 in U.S. Appl. No. 16/094,792, 26 pages.
First Office Action and Search received for Japanese Patent Application No. 2018-554735, mailed on Nov. 11, 2019, 8 pages. (English Translation Submitted).
First Office Action and Search received for Japanese Patent Application No. 2018-555215, mailed on Dec. 20, 2019, 9 pages. (English Translation Submitted).
First Office Action and Search received for Japanese Patent Application No. 2018-556825, mailed on Feb. 25, 2020, 14 pages. (English Translation Submitted).
International Preliminary Report on Patentability received for PCT Application No. PCT/US2016/035745, mailed on Dec. 14, 2017, 7 pages.
International Preliminary Report on Patentability received for PCT Application No. PCT/US2017/027261, mailed on Nov. 8, 2018, 9 pages.
International Preliminary Report on Patentability received for PCT Application No. PCT/US2017/028487, mailed on Oct. 23, 2018, 8 pages.
International Preliminary Report on Patentability received for PCT Application No. PCT/US2017/029667, mailed on Nov. 8, 2018, 6 pages.
International Search Report and Written Opinion received for PCT Patent Application No. PCT/US2017/028594, mailed on Aug. 24, 2017, 13 pages.
International Search Report and Written Opinion received for PCT Patent Application No. PCT/US2017/029667, mailed on Jul. 14, 2017, 6 pages.
International Search Report and Written Opinion received for PCT Patent Application No. PCT/US2016/035745, mailed on Sep. 30, 2016, 8 pages.
International Search Report and Written Opinion received for PCT Patent Application No. PCT/US2017/027261, mailed on Jul. 3, 2017, 10 pages.
International Search Report and Written Opinion received for PCT Patent Application No. PCT/US2017/028487, mailed on Jul. 10, 2017, 8 pages.
International Search Report and Written Opinion received for PCT Patent Application No. PCT/US2017/028526, mailed on Jul. 17, 2017, 8 pages.
Non-Final Office Action dated May 13, 2019 in U.S. Appl. No. 16/096,596, 7 pages.
Preinterview First Office Action dated Jun. 22, 2018 in U.S. Appl. No. 15/298,316, 5 pages.
Non-Final Office Action dated Jan. 4, 2021 in U.S. Appl. No. 16/095,261, 14 pages.
Notice of Allowance dated Jul. 17, 2020 in U.S. Appl. No. 16/095,281, 9 pages.
Canadian Office Action received for Canadian Patent Application No. 2988295, mailed on Feb. 5, 2018, 4 pages.
Canadian Office Action received for Canadian Patent Application No. 3021632, mailed on Oct. 3, 2019, 3 pages.
Non-Final Office Action dated Dec. 16, 2015 in U.S. Appl. No. 14/732,032, 11 pages.
Final Office Action dated May 13, 2016 in U.S. Appl. No. 14/732,032, 14 pages.
International Search Report and Written Opinion received for PCT Patent Application No. PCT/IB2021/051922, mailed on Jun. 16, 2021, 9 pages.
Non-Final Office Action dated Sep. 8, 2023 in U.S. Appl. No. 17/194,597, 7 pages.
Non-Final Office Action dated Nov. 22, 2023 in U.S. Appl. No. 16/695,280, 17 pages.
Notice of Allowance received for Korean Patent Application No. 2021-7020267, mailed on Nov. 3, 2023, 4 pages. (English translation submitted).
First Office Action and Search received for Chinese Patent Application No. 201980078515.4, mailed on Oct. 21, 2023, 16 pages. (English translation submitted).
Office Action received in Japanese Patent Application No. 2022-530718 mailed on Dec. 5, 2023, 5 pages. [English Translation submitted].
Notice of Allowance received for Canadian Patent Application No. 3121537, mailed on Oct. 27, 2023, 1 page.

(56) References Cited

OTHER PUBLICATIONS

Office Action received in Japanese Patent Application No. 2023-085041 mailed on Dec. 5, 2023, 4 pages. [English Translation submitted].
Notice of Allowance received for Canadian Patent Application No. 3162614, mailed on Oct. 19, 2023, 1 page.
Office Action received for Chinese Patent Application No. 201980102537.X, dated Jan. 31, 2024, 15 pages. (English translation submitted).
Notice of Allowance received for U.S. Appl. No. 16/695,276, mailed on Feb. 7, 2024, 9 pages.
International Search Report and Written Opinion received for PCT Patent Application No. PCT/2021/020838, mailed or Feb. 7, 2022, 25 pages.
Invitation to Pay Additional Fee received for PCT Application No. PCT/US2019/063333, mailed on Aug. 18, 2020, 9 pages.
Invitation to pay additional fees received for PCT Patent Application No. PCT/US2021/020838, mailed on Nov. 5, 2021, 14 pages.
Notice of Allowance received for Korean Patent Application No. 10-2021-7020275, mailed on Dec. 19, 2023, 4 pages (3 pages of Original OA and 1 page of English Translation).
Notice of Allowance received for U.S. Appl. No. 17/173,786, mailed on Dec. 27, 2023, 9 pages.
Office Action received for European Application No. 19827906.9, mailed on Feb. 2, 2024, 5 pages.
Notice of Allowance dated Sep. 20, 2023 in U.S. Appl. No. 17/677,363, 12 pages.
Notice of Allowance dated Aug. 2, 2023 in U.S. Appl. No. 17/941,291, 13 pages.
Non-Final Office Action dated Sep. 6, 2023 in U.S. Appl. No. 18/110,097, 16 pages.
Notice of Allowance dated Sep. 7, 2023 in U.S. Appl. No. 16/695,281, 11 pages.
Communication pursuant to Rules 161(1) and 162 EPC received for European Application No. 19827919.2, mailed on Jul. 5, 2022, 1 page.
Communication pursuant to Rules 161(1) and 162 EPC received for European Application No. 21714547.3, mailed on Sep. 19, 2023, 1 page.
Decision to Grant received for Japanese Patent Application No. 2023-548610, mailed on Oct. 29, 2024, 6 pages (3 pages of Original OA and 3 pages of English Translation).
Final Office Action received for U.S. Appl. No. 16/695,276, mailed on Nov. 5, 2024, 13 pages.
Notice of Allowance received for Australian Patent Application No. 2019388977, mailed on Jan. 15, 2025, 3 pages.
Office action received for Australian Patent Application No. 2019386065, mailed on Dec. 24, 2024, 5 pages.
Office action received for Australian Patent Application No. 2019388977, mailed on Oct. 2, 2024, 4 pages.
Office action received for Canadian Patent Application No. 3207978, mailed on Sep. 26, 2024, 4 pages.
Office action received for Chinese Patent Application No. 201980078699.4, mailed on Jul. 23, 2024, 22 pages (8 pages of Original OA and 14 pages of English Translation).
Office Action received for Chinese Patent Application No. 201980102495.X, mailed on Aug. 15, 2024, 5 pages (3 pages of Original OA and 2 pages of English Translation).
Office Action received for Chinese Patent Application No. 201980102495.X, mailed on Nov. 6, 2024, 11 pages (5 pages of Original OA and 6 pages of English Translation).
Office Action received for European Application No. 19821415.7, mailed on Dec. 23, 2024, 4 pages.
Office Action received for European Application No. 19828372.3, mailed on Dec. 23, 2024, 4 pages.
Office action received for Japanese Patent Application No. 2022-530808, mailed on Oct. 1, 2024, 2 pages (1 page of Original OA and 1 page of English Translation).

Office action received for Korean Patent Application No. 10-2022-7017126, mailed on Oct. 2, 2024, 18 pages (8 pages of Original OA and 10 pages of English Translation).
Office action received for Korean Patent Application No. 10-2022-7017368, mailed on Oct. 11, 2024, 18 pages (8 pages of Original OA and 10 pages of English Translation).
Office action received for Korean Patent Application No. 10-2022-7017787, mailed on Oct. 12, 2024, 19 pages (8 pages of Original OA and 11 pages of English Translation).
First Office Action and Search received for Chinese Patent Application No. 201980078699.4, mailed on Aug. 16, 2023, 23 pages. (English translation submitted).
First Office Action and Search received for Chinese Patent Application No. 201980102582.5, mailed on Aug. 4, 2023, 11 pages. (English translation submitted).
Office Action and Search received for Chinese Patent Application No. 201980102537.X, mailed on Jul. 29, 2023, 20 pages. (English translation submitted).
Notice of Acceptance received for Australian Patent Application No. 2019476660, mailed on Aug. 31, 2023, 3 pages.
First Office Action and Search received for Chinese Patent Application No. 201980102495.X, mailed on Aug. 30, 2023, 13 pages. (English translation submitted).
Notice of Acceptance received for Australian Patent Application No. 2019476316, mailed on Aug. 1, 2023, 3 pages.
Second Examination Report received for Australian Patent Application No. 2019476338, mailed on Sep. 13, 2023, 4 pages.
Canadian Office Action received for Canadian Patent Application No. 3162231, mailed on Oct. 17, 2023, 3 pages.
Notice of Allowance received for Canada patent application No. 3162231, mailed on Mar. 12, 2024, 1 pages.
Office action received for Australian Patent Application No. 2019476338, mailed on Mar. 25, 2024, 3 pages.
Office action received for Canada Patent Application No. 3159772, mailed on Feb. 29, 2024, 3 pages of original copies only.
Notice of Allowance received for Japanese patent application No. 2023-085041, mailed on Mar. 26, 2024, 3 pages.
Decision to Grant received for Japanese Patent Application No. 2022-530718, mailed on Jun. 4, 2024, 5 pages (3 pages of Original OA and 2 pages of English Translation).
Final Office Action received for U.S. Appl. No. 16/695,280, mailed on Jun. 26, 2024, 19 pages.
Non-Final Office Action received for U.S. Appl. No. 16/695,276, mailed on Jun. 17, 2024, 11 pages.
Non-Final Office Action received for U.S. Appl. No. 18/136,699, mailed on Jul. 5, 2024, 14 pages.
Notice of Allowance received for Chinese Patent Application No. 201980078515.4, mailed on Jun. 20, 2024, 4 pages (2 pages of English Translation and 2 page of Original Document).
Notice of Allowance received for Chinese Patent Application No. 201980102582.5, mailed on Jun. 3, 2024, 4 pages (2 pages of Original OA and 2 pages of English Translation).
Notice of Allowance received for U.S. Appl. No. 18/110,097, mailed on May 13, 2024, 9 pages.
Office action received for Chinese Patent Application No. 201980078515.4, mailed on Mar. 28, 2024, 13 pages (9 pages of Original OA and 4 pages of English Translation).
Office Action received for Chinese Patent Application No. 201980078699.4, mailed on May 1, 2024, 21 pages (8 pages of Original OA and 13 pages of English Translation).
Office Action received for Chinese Patent Application No. 201980102495.X, mailed on May 9, 2024, 14 pages (7 pages of Original OA and 7 pages of English Translation).
Office Action received for Chinese Patent Application No. 201980102537.X, mailed on May 1, 2024, 18 pages (7 pages of Original OA and 11 pages of English Translation).
Office action received for Chinese Patent Application No. 201980102582.5, mailed on Mar. 27, 2024, 9 pages (5 pages of Original OA and 4 pages of English Translation).
Notice of Allowance received for U.S. Appl. No. 16/695,276, mailed on Mar. 5, 2025, 11 pages.
Notice of Allowance received for U.S. Appl. No. 16/695,280, mailed on Apr. 1, 2025, 9 pages.

(56) References Cited

OTHER PUBLICATIONS

Notice of Allowance received for U.S. Appl. No. 18/136,699, mailed on Feb. 27, 2025, 8 pages.

\* cited by examiner

FUEL CELL ASSEMBLY WITH EXTERNAL MANIFOLD FOR PARALLEL FLOW

ExxonMobil Research and Engineering Company and FuelCell Energy, Inc. are parties to a joint research agreement.

BACKGROUND

The present application relates generally to the field of fuel cell assemblies, and more particularly to fuel cell assemblies with external manifolds that provide anode and cathode feed gas flowing in parallel directions.

A conventional fuel cell stack assembly may be formed with a plurality of fuel cells, each with an anode layer and cathode layer separated by an electrolyte layer. The plurality of fuel cells may be arranged to form a stack of fuel cells. Each anode layer includes an anode inlet (i.e., one face of the stack of fuel cells) and an opposing anode outlet (i.e., an opposite face of the stack), and anode feed gas passes through the anode layers from the anode inlet to the anode outlet in a first direction. Similarly, each cathode layer includes a cathode inlet (i.e., another face of the stack) and an opposing cathode outlet (i.e., an opposite face of the stack), and cathode feed gas passes through the cathode layers from the cathode inlet to the cathode outlet in a second direction, which is perpendicular to the first direction. The perpendicular flow of the anode feed gas and the cathode feed gas generates a two-dimensional distribution of current within the fuel cell. For example, the current may be highest in a corner proximate both the anode inlet and the cathode inlet (due to increased gas concentrations) and may be lowest in a corner proximate the anode outlet and the cathode outlet (due to decreased electrochemical activity). The two-dimensional distribution of current then varies in both the first direction and the second direction, making it difficult to optimize the flow of the anode and cathode feed gases to reduce variance in the current across each fuel cell.

The standard perpendicular flow, or cross flow, configuration produces a two-dimensional current across the cell surface, which in turn induces a two-dimensional thermal gradient. This thermal gradient, with one corner colder than the average temperature of the flow field and another corner hotter than the average temperature of the flow field, is problematic when many cells are stacked due to differential thermal expansion. The hot corner/side grows more than the cold corner/side resulting in stack distortion, tilting, and bending because the cells are no longer planar. This distortion can also induce contact loss, and vary the amount of local compression on different areas of the cell. The taller the stack, the more this effect comes into play. It would be advantageous to provide a fuel cell assembly that provides anode feed gas and cathode feed gas flowing in parallel directions in order to provide a one-dimensional distribution of current and, thus, a one-dimensional temperature gradient. If achieved, the cells within the stack will remain substantially planar, resulting in better contact, more predictable movement, and less challenges with maintaining uniform stack compression.

SUMMARY

In accordance with the present invention, a fuel cell stack is provided including a plurality of fuel cells having an anode and a cathode separated by an electrolyte matrix layer and one of the anode or the cathode has an extended edge seal chamber configured such that during operation when anode process gas and cathode process gas is provided to the fuel cell stack in substantially perpendicular directions relative to each other, those process gases flow in substantially parallel through the fuel cells.

In accordance with one embodiment of the present invention, a fuel cell used in a fuel cell stack is provided wherein the fuel cell has a first layer having an active area configured to receive and output a first process gas, a second layer configured to receive and output a second process gas, and an electrolyte matrix layer separating the first layer and the second layer. The first layer includes an edge seal chamber extending cantilever outboard from the stack face, beyond the active area on two opposite sides of the fuel cell (extended edge seal chamber). The extended edge seal chamber is configured to receive the first process gas provided to the fuel cell stack in a first direction relative to the fuel cell stack and output the first process gas to the active area in a second direction substantially perpendicular to the first direction, and substantially in parallel with the second process gas. The active area is configured to allow the first process gas to react with the second process gas. The two gasses within the active area flow substantially parallel to each other.

In another aspect, the second layer is configured to receive and output the second process gas in a direction substantially parallel to the second direction.

In another aspect, the first layer includes a diverting surface configured to receive the first process gas and divert the first process gas into the extended edge seal chamber.

In accordance with another embodiment of the present invention, a fuel cell used in a fuel cell stack is provided wherein the fuel cell has an anode layer having an active anode area configured to receive and output anode process gas, a cathode layer configured to receive and output cathode process gas, and an electrolyte matrix layer separating the anode layer and the cathode layer. The anode layer includes a first extended edge seal chamber extending away from the active anode area on a first side of the fuel cell. The first extended edge seal chamber is configured to receive anode process gas provided to the fuel cell stack in a first direction relative to the fuel cell stack and output the anode process gas to the active anode area in a second direction substantially perpendicular to the first direction. The anode active area is configured to allow the anode process gas to react with the cathode process gas.

In another aspect, the fuel cell includes a second extended edge seal chamber extending away from the active anode area on a side opposite the first side of the fuel cell. The second extended edge seal chamber is configured to receive the anode process gas in the second direction and divert the anode process gas in the first direction relative to the fuel cell stack.

In another aspect, the cathode layer is configured to receive the cathode process gas in a direction substantially parallel to the second direction.

In another aspect, the cathode layer is configured to output the cathode process gas in a direction substantially parallel to the second direction.

In another aspect, the anode layer includes a first diverting surface configured to receive the anode process gas in the first direction and redirect the anode process gas toward the first extended edge seal chamber.

In another aspect, the anode layer includes a second diverting surface configured to receive the anode process gas from the second extended edge seal chamber and redirect the anode process gas in the first direction.

DETAILED DESCRIPTION

Figure 1:
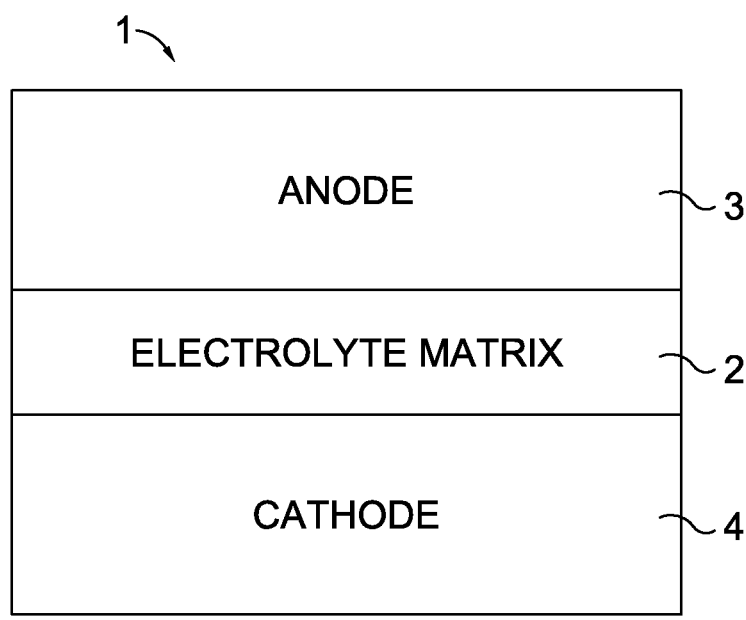
FIG. 1 is a schematic of a fuel cell.

FIG. 1 shows a schematic of a fuel cell 1. The fuel cell 1 comprises an electrolyte matrix 2, and anode 3, and cathode 4. The anode 3 and cathode 4 are separated from one another by the matrix 2. An oxidant (e.g., air or flue gas from a combustion exhaust supply unit) is fed to the cathode 4. Fuel gas (e.g., hydrocarbon gas) is fed to the anode 3. In the fuel cell 1, in the cathode, $CO_2$ and $O_2$ in the form of $CO_3^=$ ions are transferred from the cathode to the anode, fuel gas and oxidant gas undergo an electrochemical reaction in the presence of an electrolyte (e.g., carbonate electrolyte) present in the pores of the electrolyte matrix 2.

Figure 2:
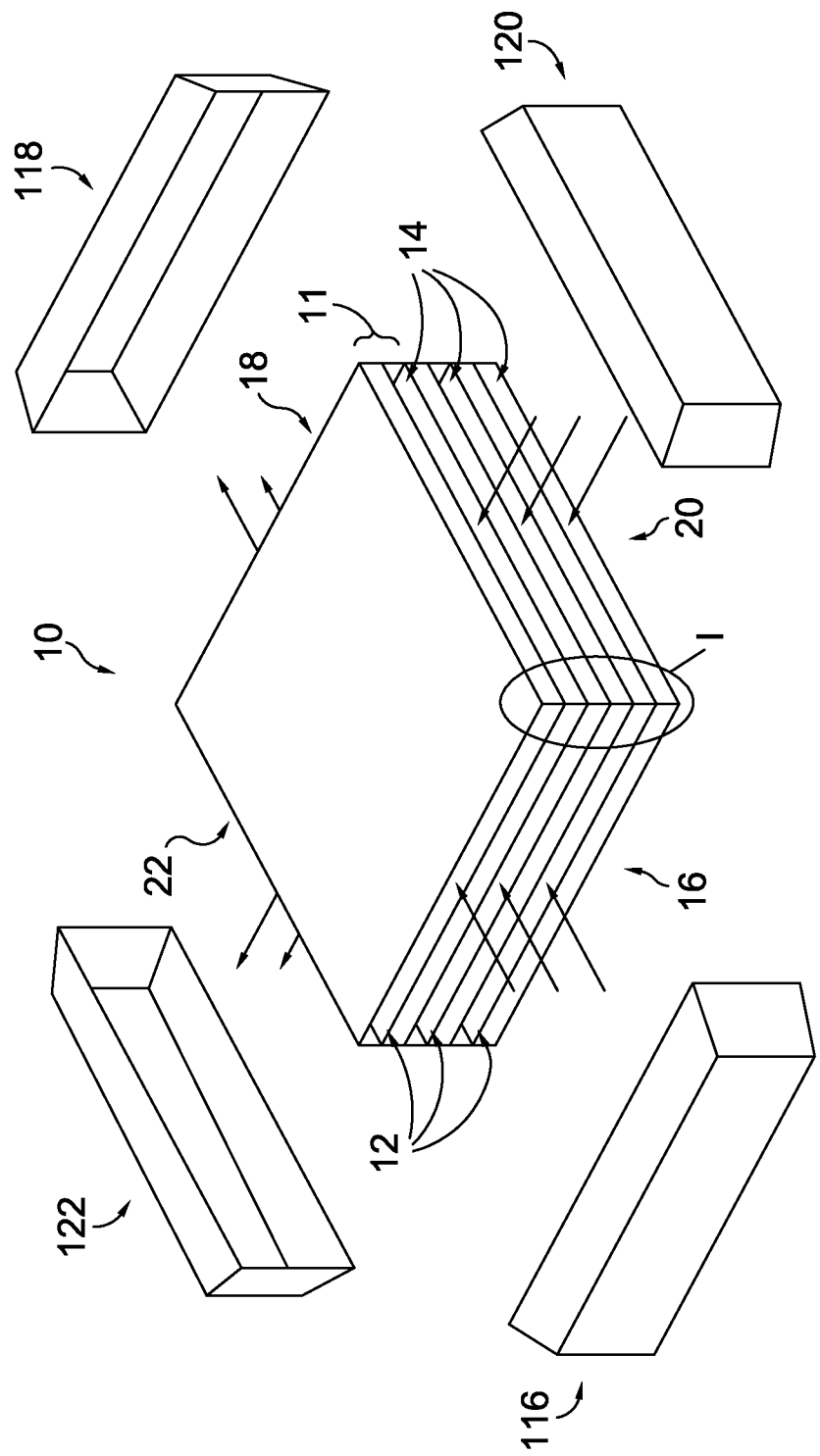
FIG. 2 is a perspective view of a conventional fuel cell stack.

Referring to FIG. 2, a conventional fuel cell stack 10 includes a plurality of fuel cells 11, each having an anode layer 12 (comprising an anode electrode and an anode flow chamber/current collector, not shown) and a cathode layer 14 (comprising a cathode electrode and an cathode flow chamber/current collector, not shown), with the fuel cells stacked one on top of another and so on. The fuel cell stack 10 includes an anode inlet side (or stack face) 16 configured to receive anode feed gas and an opposing anode outlet side (or stack face) 18 configured to output anode exhaust after it has passed through an anode layer 12. The anode feed gas may be provided via an external manifold (anode inlet manifold 116) sealed against the anode inlet stack face 16. For reference purposes, the external manifolds depicted in FIG. 2 have been removed from the fuel cell stack 10. To be clear, during operation, external manifolds (e.g., anode inlet manifold 116) would be sealed against corresponding fuel stack face. The anode exhaust may be received by another external manifold sealed against the anode outlet stack face 18 (anode outlet manifold 118). The fuel cell stack 10 further includes a cathode inlet side (or stack face) 20 configured to receive cathode feed gas and an opposing cathode outlet side (or stack face) 22 configured to output cathode exhaust after it has passed through a cathode layer 14. The cathode feed gas may be provided via an external manifold sealed against the cathode inlet stack face 20 (cathode inlet manifold 120). The cathode exhaust may be received by another external manifold sealed against the cathode outlet stack face 22 (cathode outlet manifold 122). In some embodiments, at least three of the four stack faces may have external manifolds sealed against each stack face. For example, the stack may be housed in sealed housing (e.g., module) and the anode inlet side, the anode outlet side, and the cathode inlet side may be sealed with external manifolds. The cathode outlet side in this example may be open to the sealed housing.

In the fuel cell stack 10 shown in FIG. 2, anode feed gas flows through each anode layer 12 in a substantially linear direction from the anode inlet stack face 16 to the anode outlet stack face 18. (As referenced herein, "substantially linear" means a majority of volume of a gas flows in a certain direction.) Similarly, the cathode feed gas flows through the cathode layer 14 in a substantially linear direction from the cathode inlet stack face 20 to the cathode outlet stack face 22. The anode and cathode feed gases flow substantially perpendicularly to each other (i.e., a majority of volume of anode feed gas flows in a first direction and a majority of volume of cathode feed gas flows in a second direction that is substantially perpendicular to the first direction) when they are within the stack (also known as "cross-flow"). Because of this, the current density may be highest at a corner of the fuel cell stack 10, proximate where the anode inlet side 16 meets the cathode inlet side 20 (region I) and varies non-linearly in the directions of each of the anode feed gas flow and the cathode feed gas flow through the fuel cell assembly 11. It would therefore be advantageous to reorient the flow of the anode feed gas and the cathode feed gas relative to each other within the stack, such that the anode and cathode flows pass through the fuel cell stack 10 in a substantially parallel configuration (also known as "parallel flow", "co-flow", or "counter-flow").

The present invention allows substantially parallel flow of two process gas mixtures within a four-sided fuel cell stack where the two process gas mixtures are supplied and removed from the stack in substantially perpendicular directions from each other. In other words, the present invention allows substantially parallel flow within a fuel cell stack without significantly changing the process gas delivery to and from the fuel cell stack (i.e., with external manifolds) as described in relation to FIG. 2.

Figure 3:
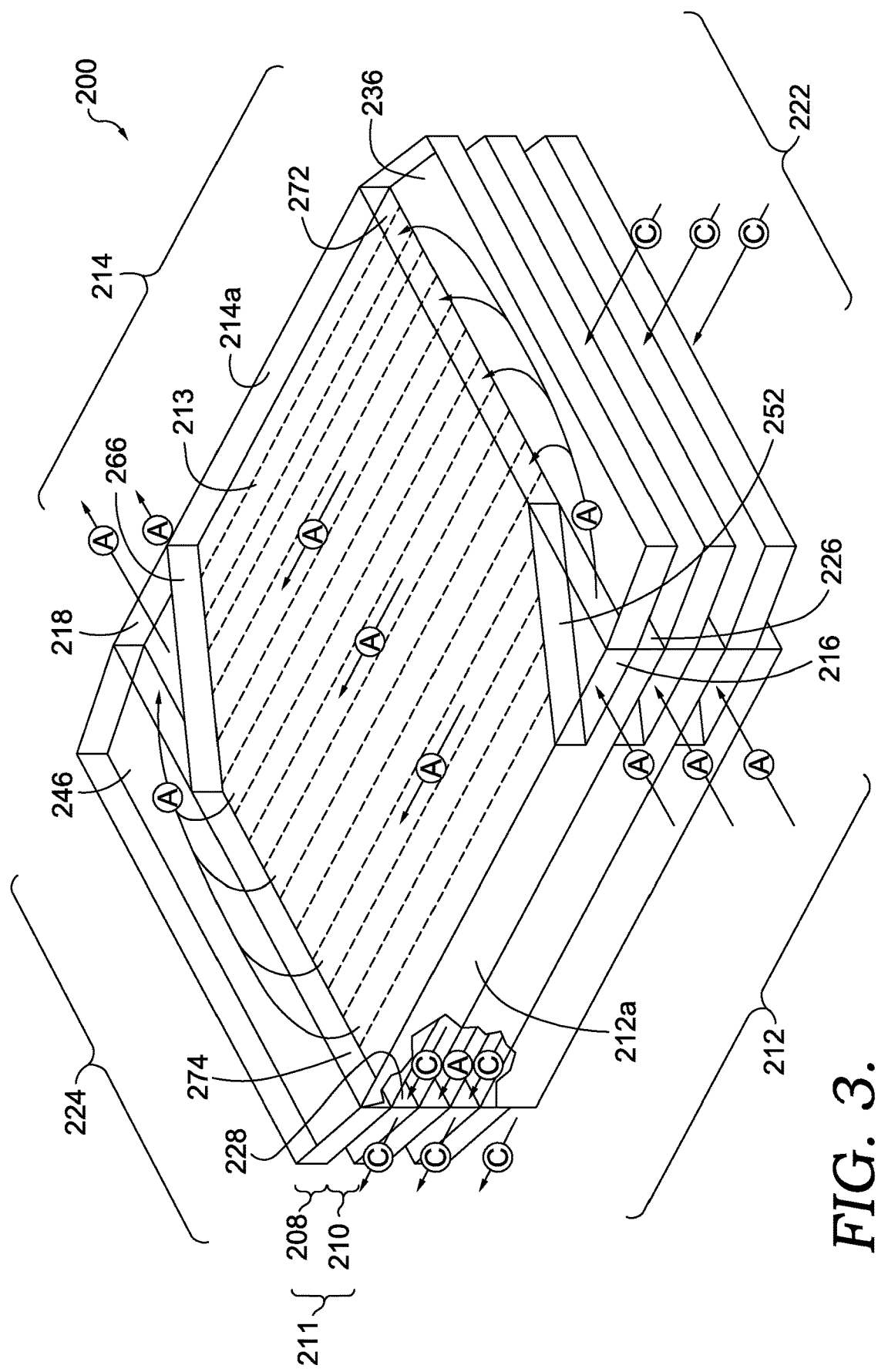
FIG. 3 is a perspective view of a fuel cell stack, according to an exemplary embodiment.

Referring now to FIG. 3, the fuel cell stack 200 shows how anode feed gas passes through corners of the fuel cell stack 200 to be redirected substantially parallel to the cathode feed gas and anode exhaust is again redirected to be output substantially perpendicularly to the cathode exhaust. (For ease of reference, arrows designated with "A" represent the flow path for anode process gas and arrows designated with "C" represent the flow path for cathode process gas.) The fuel cell stack 200 includes a plurality of fuel cell assemblies 211, each having an anode layer 208 and a cathode layer 210, with the fuel cells stacked on top of one another and separated from each other by a steal separator sheet (e.g., a bipolar plate). It is noted that the top surface of the top most fuel cell assembly 211 has been removed to show flow paths within that fuel cell assembly. It will be appreciated that save for the porous active area of the anode electrode (anode active area) 213, the anode layer 208 of each fuel cell assembly 211 is otherwise a sealed chamber with a single inlet (partial anode inlet 216, discussed below) and a single outlet (partial anode outlet 218, discussed below). As used herein, "active area" is the area on a fuel cell layer (anode, cathode) that is configured to allow selective diffusion of molecules in a process gas to diffuse there through, i.e., feed gases undergo an electrochemical reaction in the active area. Said another way, the leading and trailing edges of both the anode and cathode of a fuel cell have a narrow non-active area corresponding to a wet seal between adjacent cells above and below the fuel cell. Feed gases pass through the wet seal without undergoing an electrochemical reaction. The rest of the area of the fuel cell, which is overlapping and common to both the anode and cathode layers, is subject to electrochemical activity and is known as the "active area". Similarly, apart from a porous active cathode electrode (not shown), the cathode layer 210 of each fuel cell assembly 211 is otherwise a sealed chamber with a cathode inlet 226 and a cathode outlet 228. It will be further noted that portions of the side walls of the fuel cell assemblies 211 have been removed to show flow paths through the cathode layer of the top most fuel cell assembly 211 (and flow paths of the anode and cathode layers of the fuel cell assembly 211 directly below the top most fuel cell assembly 211). It will also be further noted that reference may be made to enumerated features corresponding to the top most fuel cell assembly 211, but such enumerated features may be applicable to other fuel cell assemblies 211 included in fuel cell stack 200.

It will be noted that the fuel cell assemblies 211 described herein include an anode layer 208 and a cathode layer 210 separated by an electrolyte matrix layer, and steal separator sheets form the upper surface and lower surface of the fuel cell assembly. However, in other embodiments, a first fuel cell assembly may include an anode layer 208 and a cathode layer 210 separated by a steal separator sheet, and an anode electrode forms a first surface (e.g., upper surface) and a cathode electrode forms a second surface (e.g., lower surface). A single functional fuel cell unit is formed when a second fuel cell assembly (having the same components as the first fuel cell assembly) is stacked on top or below the first fuel cell assembly and the two fuel cell assemblies are separated by an electrolyte matrix layer. In other words, a single fuel cell unit is formed when the cathode of the first fuel cell assembly communicates with an electrolyte matrix, which communicates with the anode of the second fuel cell assembly.

Although FIG. 3 shows three fuel cell assemblies 211, the invention is not so limited and a fuel cell stack may comprise more or less fuel cell assemblies. Each fuel cell assembly 211 includes two extended edge seal chambers 236, 246—a first extended edge seal chamber 236 (e.g., an upstream extended edge seal chamber) on a first side of the fuel cell assembly and a second extended edge seal chamber 246 (e.g., a downstream extended edge seal chamber) on the opposite side of the fuel cell assembly. As depicted in FIG. 3, the extended edge seal chambers extend cantilever outboard from the stack face, beyond the active area on two opposite sides of the fuel cell.

As with the fuel cell stack 10 depicted in FIG. 2, the fuel cell stack 200 (in FIG. 3) includes an anode inlet side (or stack face) 212 and an opposing anode outlet side (or stack face) 214, which is substantially parallel to the anode inlet side 212. However, unlike the anode inlet stack face 16 of fuel cell stack 10, which includes a substantially open face/inlet for anode feed gas to enter each fuel cell, the anode inlet stack face 212 is not so open and each fuel cell assembly 211 includes a first partial seal 212a and a partial anode inlet 216. In an exemplary embodiment, an external manifold is sealed against the anode inlet stack face 212 (not shown) and anode feed gas provided in the external manifold (not shown) enters the anode section of the fuel cell via the partial anode inlet 216. Similarly, unlike the anode outlet stack face 18 of fuel cell stack 10, which includes a substantially open face/outlet (not shown) for anode exhaust to leave each fuel cell, the anode outlet stack face 214 is not so open and each fuel cell assembly 211 includes a second partial seal 214a and a partial anode outlet 218.

During operation of the fuel cell stack 200, each anode layer 208 is configured to receive anode feed gas at the anode inlet side 212 of the fuel cell stack 200 from an anode feed gas supply (i.e., source), for example, via an external manifold (not shown), and to output anode exhaust at the anode outlet side 214 of the fuel cell stack 200, for example, via another external manifold (not shown), after the anode feed gas has been reacted with cathode feed gas in the fuel cell stack 200. Specifically, each anode layer 208 includes a partial anode inlet 216 (i.e., an anode inlet opening) formed in only a portion of the anode inlet side 212, at an upstream portion of the anode layer 208. Each anode layer 208 further includes a partial anode outlet 218 (i.e., an anode outlet opening) formed in only a portion of the anode outlet side 214, at a downstream portion of the anode layer 208.

The fuel cell stack 200 further includes a cathode inlet side (or stack face) 222 and an opposing cathode outlet side (or stack face) 224, which is substantially parallel to the cathode inlet side 222. In some embodiments, the cathode layers 210 are similar in structure to, and similarly operate as, the cathode layers 14 of fuel cell stack 10 depicted in FIG. 2. In other words, in some embodiments, the cathode feed gas may flow through the cathode layer 210 in a substantially linear direction from the cathode inlet stack face 222 to the cathode outlet stack face 224. As depicted in FIG. 3, it will be appreciated that the first extended edge seal chamber 236 (at the anode layer 208) is cantilevered over a cathode inlet 226. Moreover, a plurality of the first extended edge seal chambers 236 forms a series of cantilevered protrusions along the cathode inlet stack face 222. Similarly, a plurality of the second extended edge seal chambers 246 forms a series of cantilevered protrusions along the cathode outlet stack face 224.

During operation of the fuel cell stack 200, each cathode layer 210 is configured to receive cathode feed gas at the cathode inlet side 222 of the fuel cell stack 200 from a cathode feed gas supply (i.e., source), for example, via an external manifold (not shown), and to output cathode exhaust at the cathode outlet side 224 of the fuel cell stack 200, for example, via an external manifold (not shown), after the cathode feed gas has been reacted with anode feed gas in the fuel cell stack 200. Specifically, each cathode layer 210 includes a cathode inlet 226 (i.e., a cathode inlet opening) formed in the cathode inlet side 222, at an upstream portion of the cathode layer 210. Each cathode layer 210 further includes a cathode outlet 228 (i.e., a cathode outlet opening) formed in the cathode outlet side 224, at a downstream portion of the cathode layer 210. According to an exemplary embodiment, the cathode inlet 226 and the cathode outlet 228 may extend substantially an entire width of the cathode layer 210, although according to other exemplary embodiments, the cathode inlet 226 and/or the cathode outlet 228 may extend along only a portion of the width of the cathode layer 210.

As shown in FIG. 3, the anode feed gas is supplied to and the anode exhaust is output from the anode layer 208 along substantially parallel flow paths through the fuel cells and fuel cell stack. For example, the anode feed gas is fed to the anode layer 208 from the anode inlet manifold (not shown) along a streamline substantially perpendicularly to the anode inlet stack face 212. The anode feed gas fed through partial anode inlet 216 is redirected with an anode inlet diverter (a diverting surface) 252 through the first extended edge seal chamber 236 and back into the anode active area 213 of the fuel cell assembly 211 into a stream substantially parallel with the flow of cathode feed gas and then into the second extended edge seal chamber 246 and then output through the partial anode outlet 218. It will be appreciated that a portion of the anode gas traveling through the active anode section is redirected with a first side of an anode outlet diverter (another diverting surface) 266 into the second extended edge seal chamber 246 and that the anode gas traveling through the second extended edge seal chamber 246 may be redirected with a second side of the anode outlet diverter 266 through the partial anode outlet 218.

In the above configuration, the anode exhaust is diverted into a streamline flowing substantially perpendicularly to the anode outlet stack face 214 of the fuel cell stack 200. As further shown in FIG. 3, the cathode inlet stack face 222 and the cathode outlet stack face 224 are substantially perpendicular to the anode inlet stack face 212 and the anode outlet stack face 214 of the fuel cell stack 200. In this configuration, the cathode feed gas is supplied to and the cathode exhaust is output from the cathode layer 210 along substantially parallel flow paths from each other. For example, the cathode feed gas flows along a streamline substantially perpendicularly to the cathode inlet stack face 222 and the cathode exhaust gas flows along a streamline substantially perpendicularly to the cathode outlet stack face 224. According to an exemplary embodiment, the flow of the cathode feed gas through the cathode layer 210, as it is reacted and converted into cathode exhaust, flows along a substantially linear streamline between the cathode inlet 226 and the cathode outlet 228.

Although the first and second extended edge seal chambers 236, 246 depicted in FIG. 3 have a trapezoidal footprint extending away from the anode active area bounded by one long sidewall, two shorter sidewalls, a top surface, and a bottom surface, it will be appreciated that the invention is not so limited. The first extended edge seal chamber 236 may have any dimension, or be any shape, that encloses a chamber capable of accepting anode process gas fed via partial anode inlet 216 and redirected by anode inlet diverter 252 and providing that anode process gas to the anode active area 213 through anode active area inlet 272. Similarly, the second extended edge seal chamber 246 may have any dimension, or be any shape, that encloses a chamber capable of accepting anode process gas fed via anode active area outlet 274 and providing that anode process gas through the partial anode outlet 218 (via redirection by anode outlet divert 266).

As shown in FIG. 3, the anode inlet diverter 252 extends at a non-perpendicular angle relative to each of the anode inlet side 212 and cathode inlet side 222 of the fuel cell stack 200. Also, as depicted in FIG. 3, the anode inlet diverter 252 extends in a straight, linear fashion from the anode inlet side 212 toward the cathode inlet side 222. However, the anode inlet diverter 252 may be curved (concave or convex) or any other shape, as long as it redirects anode process gas fed through partial anode inlet 216 into the first extended edge seal chamber 236. The anode inlet diverter 252 extends vertically along substantially an entire height of the anode layer 208, such that anode feed gas does not pass over or under the anode inlet diverter 252 into the rest of the anode layer 208.

Similarly, anode outlet diverter 266 extends at a non-perpendicular angle relative to each of the anode outlet side 214 and cathode outlet side 224 of the fuel cell stack 200. Although the anode inlet diverter 252 depicted in FIG. 3 extends in a straight, linear fashion from the anode outlet side 214 toward the cathode outlet side 224, the anode inlet diverter 252 may be curved (concave or convex) or any other shape, as long as it redirects anode process gas fed through second extended edge seal chamber 236 through the partial anode outlet 218. The anode outlet diverter 266 extends vertically along substantially an entire height of the anode layer 208, such that anode process gas does not pass over or under the anode outlet diverter 252.

Referring back to FIG. 2, it will be appreciated that as a process gas flows through a fuel cell, the composition of that gas will change as it travels across the fuel cell and is reacted with another process gas in the fuel cell. As such, the composition of the anode process gas flowing through fuel cell stack 10 (in FIG. 2) changes as it travels from the anode inlet side 16 to the anode outlet side 18 of the stack. However, the composition of the cathode process gas entering fuel cell stack 10 is uniformly distributed along the width of the cathode layer 14 (measured from the anode inlet side 16 to the anode outlet side 18 of the fuel cell stack 10). In contrast, during operation of the embodiment depicted in FIG. 3, the anode process gas enters the anode active area 213 through the active anode inlet 272 rather than an opening spanning the anode inlet side 212 of the fuel cell stack 200 (such as depicted in FIG. 2). As with fuel cell stack 10 (in FIG. 2), the cathode process gas enters the fuel cell stack 200 (at the cathode inlet side 222) in a substantially uniform flow distribution along the entire width of the cathode layer 210 (measured from the anode inlet side 212 to the anode outlet side 214 of the fuel cell stack 200). Thus, the composition of the anode process gas entering the anode active area 213 and the composition of the cathode process gas entering the cathode layer 210 are substantially uniform across the width of the fuel cell stack 200 (measured from the anode inlet side 212 to the anode outlet side 214 of the fuel cell stack 200). As will be discussed below, the uniform compositional distribution of the process gases entering the stack (along the width of the cathode inlet) in a substantially parallel fashion enables a more uniform distribution of current density across the cathode inlet span, instead of higher current densities proximate the anode inlet side 16 and cathode inlet side 20 of stack 10 (region I of FIG. 2) and lower current densities away from the inlets.

Figure 4A:
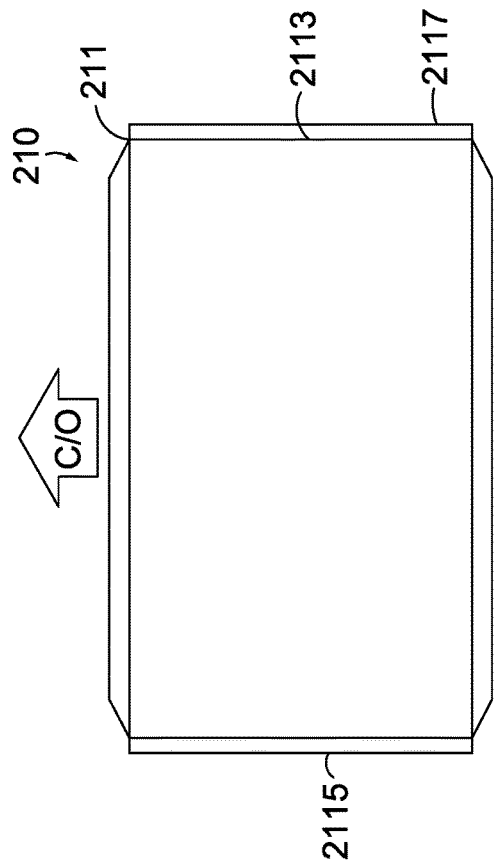
FIG. 4A is a top plan view of a fuel cell assembly, according to an exemplary embodiment.

FIG. 4A is a top plan view of fuel cell stack 200 with the top surface of the anode layer 208 (of the topmost fuel cell assembly 211) removed to show (a) anode feed gas entering the anode active area 213 from a first extended edge seal chamber 236, and (b) anode exhaust entering the second extended edge seal chamber 246 from the anode active area 213. The flow of anode process gas across the anode active area (which enters as anode feed gas and exits as anode exhaust) in a substantially linear fashion parallel to the flow of cathode process gas through the cathode layer 210 of the fuel cell assembly 211. As noted above, this flow arrangement may be described as co-flow.

Figure 4B:
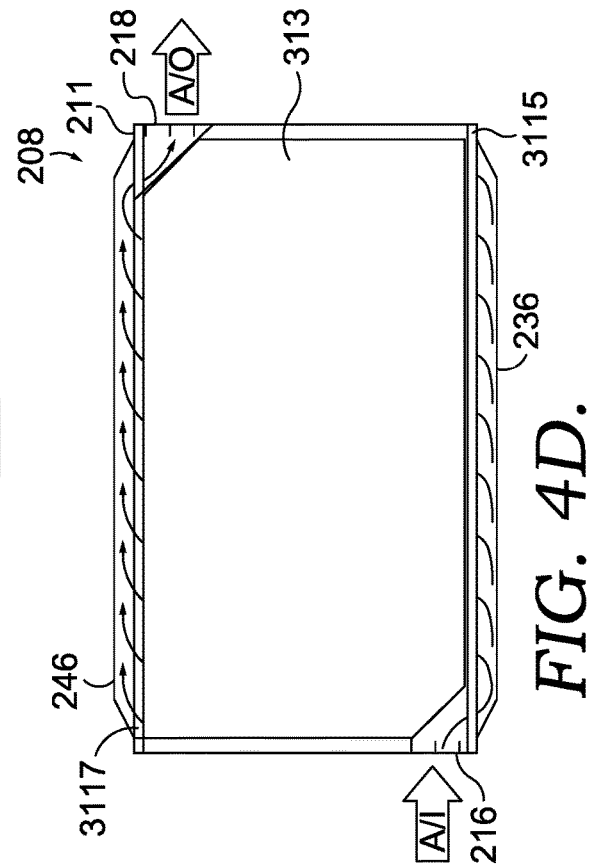
FIG. 4B is a top plan view of a fuel cell assembly, according to another exemplary embodiment.

FIG. 4B depicts anode process gas flow through a fuel cell assembly in a counter-flow direction. FIG. 4B is a top plan view of fuel cell stack 300 with the top surface of the anode layer 308 (of the topmost fuel cell assembly 311) removed. Similar to fuel cell stack 200 and fuel cell assembly 211, the anode process gas enters fuel cell stack 300/fuel cell assembly 311 from an anode inlet side that is perpendicular to a side where cathode process gas enters and anode process gas exits a side opposite the anode inlet side and the cathode process gas exits a side opposite the cathode inlet side. The anode process gas enters the anode inlet side of fuel cell assembly 311 via a partial anode inlet 316, which is similar to the partial anode inlet 216 (for fuel cell assembly 211). However, partial anode inlet 316 is proximate a stack corner between the anode inlet side and the cathode outlet side of fuel cell stack 300. Whereas the partial anode inlet 216 (for fuel cell assembly 211) is proximate a stack corner between the anode inlet side and the cathode inlet side of fuel cell stack 200. After entering the fuel cell assembly 311, the anode process gas is redirected (by an anode inlet diverter 352) into a first extended edge seal chamber 326 (located on a cathode outlet side of fuel cell assembly 311) and redirected further into the anode active area 313. Reacted anode process gas exits the anode active area 313 and enters the second extended edge seal chamber 346 and is redirected toward anode outlet divert 366 and anode partial outlet 318. In this configuration, the anode process gas traverses the anode active area 313 in a direction substantially parallel to, but opposite of, the cathode process gas traversing thru the cathode layer of fuel cell assembly 311.

In either flow configuration (co-flow or counter-flow), the distribution of each of the anode feed gas and cathode feed gas is substantially uniform laterally across the fuel cell stack in the direction from the anode inlet side to the anode outlet side, providing a one-dimensional distribution of current density across the fuel cell stack (measured from cathode inlet to cathode outlet).

It will be appreciated that the co-flow configuration depicted in FIG. 4A and the counter-flow configuration depicted in FIG. 4B can utilize the same external manifold arrangements described herein with respect to fuel cell stack 10 (depicted in FIG. 2). Alternatively, a counter-flow configuration may be achieved with the embodiment of FIG. 4A by rearranging the direction of the anode process gas through the fuel cell stack (e.g., switching the anode inlet manifold with the anode outlet manifold) or by rearranging the direction of the cathode process gas through the fuel cell stack (e.g., switching the cathode inlet manifold with the cathode outlet manifold).

Figure 4C:
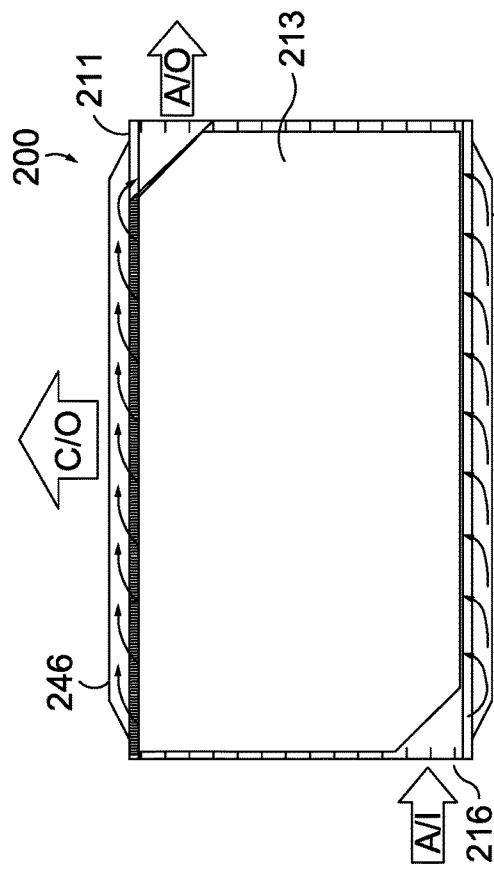
FIG. 4C is a top plan view of a cathode level of the fuel cell assembly depicted in FIG. 4A.

FIG. 4C is a top plan view of cathode layer 210 (of fuel cell assembly 211) with the cathode electrode removed to show cathode active area 2113. During operation, cathode process gas traverses cathode active area 2113 in a substantially linear path from the cathode inlet side to the cathode outlet side. First cathode edge seal 2115 prevents cathode process gas from entering the anode inlet side of fuel cell assembly 211, e.g., anode inlet manifold (not shown). Second cathode edge seal 2117 prevents cathode process gas from entering the anode outlet side of fuel cell assembly 211, e.g., anode outlet manifold (not shown).

Figure 4D:
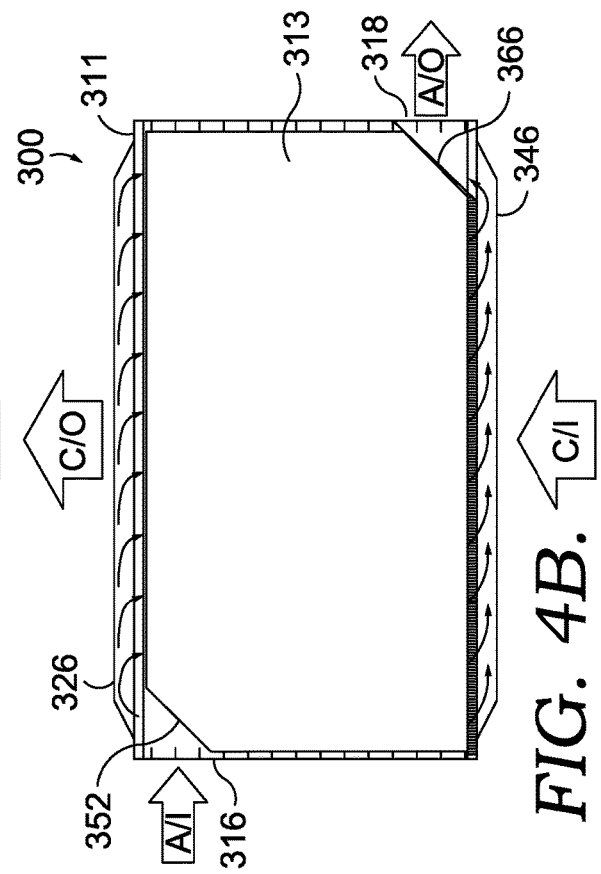
FIG. 4D is a top plan view of an anode level of the fuel cell assembly depicted in FIG. 4A.

FIG. 4D is a top plan view of anode layer 208 (of fuel cell assembly 211) with major portions of the top surface covering the anode active area 313 and the extended edge seal chambers 236, 246. During operation, as described in detail above, anode process gas enters first extended edge seal chamber 236 and traverses anode active area 313 in a substantially linear path from the cathode inlet side to the cathode outlet side (of fuel cell assembly 211). First anode edge seal 3115 prevents anode process gas from entering the cathode inlet side of the fuel cell assembly 211, e.g., cathode inlet manifold (not shown), as the anode process gas travels from partial anode inlet 216 to first extended edge seal chamber 236 and to anode active area 313. Second anode edge seal 3117 prevents anode process gas from entering the cathode outlet side of fuel cell assembly 211, e.g., cathode outlet manifold (not shown), as anode process gas travels from anode active area 313 to second extended edge seal chamber 246 and to anode partial outlet 218.

According to yet another exemplary embodiment, it should be understood that the cathode layer 210 may be configured in substantially the same way as and in place of the anode layer 208, such that an extended edge seal chamber associated with the cathode inlet (e.g., "cathode inlet chamber" or first extended edge seal chamber 236) is disposed on a stack side adjacent (and perpendicular) to the cathode inlet side 222 and configured to cooperate with an inlet diverter in the cathode layer 210 to redirect cathode feed gas therein to be substantially parallel with anode feed gas received directly at the anode inlet side 212 of the stack. Similarly, an extended edge seal chamber associated with the cathode outlet (e.g., "cathode outlet chamber" or second extended edge seal chamber 246) may be disposed on a stack side opposite the cathode inlet chamber and configured to cooperate with an outlet diverter in the cathode layer to redirect cathode exhaust from the fuel cell stack 200.

Figure 5:
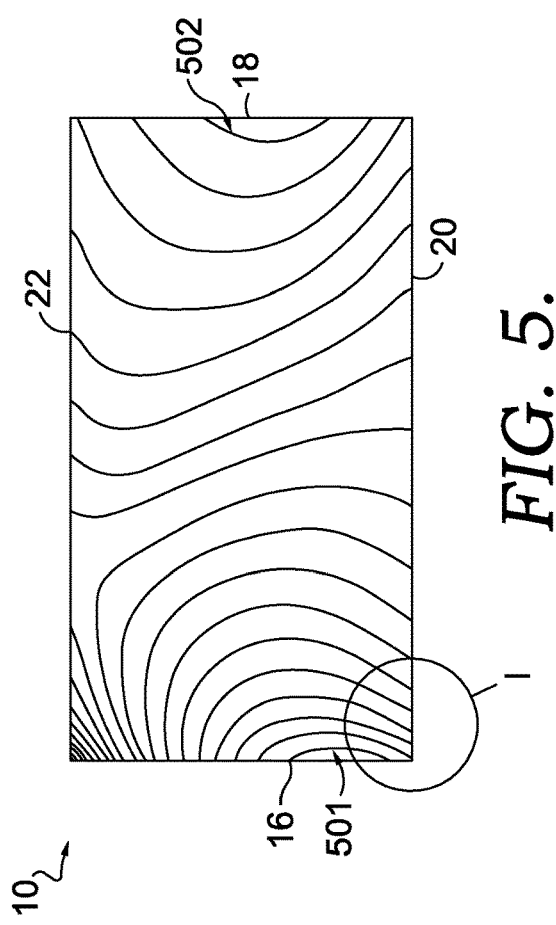
FIG. 5 shows a distribution of current in a conventional fuel cell assembly with bipolar plates providing a flow of anode feed gas perpendicular to a flow of cathode feed gas.

Referring now to FIG. 5, a representative distribution of current density on the conventional fuel cell stack 10 is shown, wherein isometric lines show contours of current density of the same value. Isometric line 501 represents the highest current density value and isometric line 502 represents the lowest current density value. It will be appreciated that intervening isometric lines between 501 and 502 represent intermediate current density values at regular intervals. In this configuration, the current has the highest density along the anode inlet side 16 proximate the corner where the anode inlet side 16 contacts the cathode inlet side 20 (region I). The current density drops non-linearly in the direction from the anode inlet side 16 to the anode outlet side 18. The current density also drops non-linearly in the direction from the cathode inlet side 20 to the cathode outlet side 22. The distribution of current density in each of these two directions provides for a two-dimensional current distribution, which makes the fuel cell stack 10 difficult to optimize. Notably, even if a large portion of the fuel cell stack 10 is able to be optimized to linearize current distribution, the corner where the anode inlet side 16 contacts the cathode outlet side 22 experiences a significant and sudden current drop, which may disrupt the performance of the fuel cell stack 10.

Figure 6:
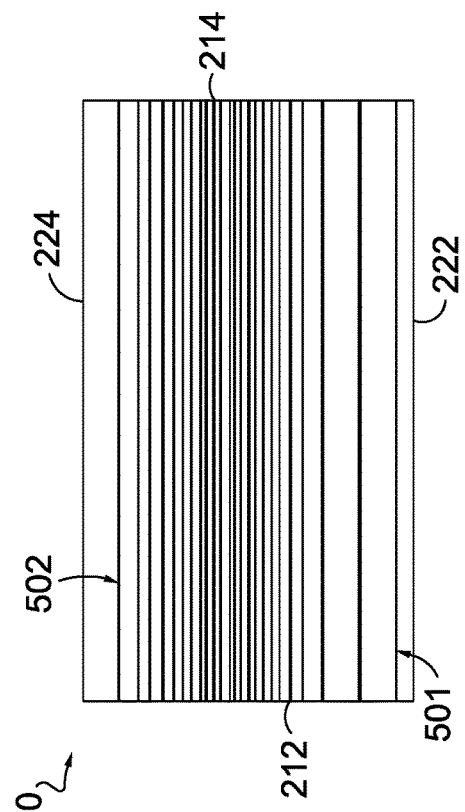
FIG. 6 shows a distribution of current in a fuel cell assembly with bipolar plates providing a flow of anode feed gas parallel to a flow of cathode feed gas.

Referring now to FIG. 6, a distribution of current density in the fuel cell stack 200 is shown according to an exemplary embodiment, wherein isometric lines show contours of current density of the same value. Similar to FIG. 5, isometric line 501 represents the highest current density value and isometric line 502 represents the lowest current density value. It will be appreciated that intervening isometric lines between 501 and 502 represent intermediate current density values at regular intervals. This configuration may show the current density when both the anode feed gas and the cathode feed gas flow in the fuel cell stack 200 from the cathode inlet side 222 toward the cathode outlet side 224. The substantially parallel flows of the anode feed gas and the cathode feed gas provide for a substantially constant current density measured in a lateral direction perpendicular to the flow direction. For example, the current density at any given point in the fuel cell stack 200 may be substantially the same moving in a direction from the anode inlet side 212 directly toward the anode outlet side 214.

The CFD models depicted in FIGS. 5 and 6 are representative of current density profiles of a typical fuel cell within a conventional fuel cell stack 10 and a fuel cell stack 200 according to an exemplary embodiment, wherein both stacks are operated under similar total thermal gradients across the cell. Pictorially, it will be appreciated that fuel cell stack 200 has a more uniform and predictable current gradient across the cell. In addition, fuel cell stack 200 is predicted to be able to produce an overall higher total current than convention fuel cell stack 10 when operated at a similar total thermal gradient across the fuel cells. This is possible because fuel cell stack 200 provides a long leading-edge interface common to both the highest concentration cathode and anode gasses, resulting in larger areas of high current density (proximate cathode inlet side 222, see 501 in FIG. 6) compared to a single corner location in conventional fuel cell stack 10 where both reactants are at their highest concentration (region I, see 501 in FIG. 5). Specifically, the highest current density may be established at a location where the anode feed gas and the cathode feed gas are first introduced on opposing sides of the electrolyte matrix and the current density declines as feed gas is reacted and converted into exhaust. The substantially parallel flow paths for the anode feed gas and cathode feed gas, which form a one-dimensional distribution of current density increases the surface area in the fuel cell stack 200 in which the anode feed gas and the cathode feed gas first react, since in the fuel cell stack 200, the feed gases react across substantially the entire length of the cathode inlet side 222 of the fuel cell stack 200, rather than just at a corner.

ADDITIONAL EMBODIMENTS

Embodiment 1. A fuel cell comprising: an anode configured to receive, and allow to pass through, an anode process gas, a cathode configured to receive, and allow to pass through, a cathode process gas, an electrolyte matrix layer separating the anode and the cathode, wherein one of the anode or the cathode has an extended edge seal chamber, wherein the fuel cell is configured to receive the anode process gas and the cathode process gas in substantially perpendicular directions relative to each other, and wherein the extended edge seal chamber is configured to allow the anode process gas and the cathode process gas to pass through the anode and the cathode in substantially parallel flow paths.

Embodiment 2. A fuel cell stack comprising: a fuel cell comprising: a first layer having an active area configured to receive and output a first process gas, a second layer configured to receive and output a second process gas, and an electrolyte matrix layer separating the first layer and the second layer, wherein the first layer includes an extended edge seal chamber extending away from the active area on a first side of the fuel cell, wherein the extended edge seal chamber is configured to receive the first process gas provided to the fuel cell stack in a first direction relative to the fuel cell stack and output the first process gas to the active area in a second direction substantially perpendicular to the first direction, and wherein the active area is configured to allow the first process gas to react with the second process gas.

Embodiment 3. The fuel cell stack of embodiment 2, wherein the second layer is configured to receive and output the second process gas in a direction substantially parallel to the second direction.

Embodiment 4. The fuel cell stack of embodiment 2 or 3, wherein the first layer includes a diverting surface configured to receive the first process gas and divert the first process gas into the extended edge seal chamber.

Embodiment 5. A fuel cell used in a fuel cell stack comprising: the fuel cell comprises an anode layer having an active anode area configured to receive and output anode process gas, a cathode layer configured to receive and output cathode process gas, and an electrolyte matrix layer separating the anode layer and the cathode layer, wherein the anode layer includes a first extended edge seal chamber extending away from the active anode area on a first side of the fuel cell, wherein the first extended edge seal chamber is configured to receive anode process gas provided to the fuel cell stack in a first direction relative to the fuel cell stack and output the anode process gas to the active anode area in a second direction substantially perpendicular to the first direction, and wherein the anode active area is configured to allow the anode process gas to react with the cathode process gas.

Embodiment 6. The fuel cell of embodiment 5, wherein the fuel cell further comprises: a second extended edge seal chamber extending away from the active anode area on a side opposite the first side of the fuel cell, wherein the second extended edge seal chamber is configured to receive the anode process gas in the second direction and divert the anode process gas in the first direction relative to the fuel cell stack.

Embodiment 7. The fuel cell of embodiment 5 or 6, wherein the cathode layer is configured to receive the cathode process gas in a direction substantially parallel to the second direction.

Embodiment 8. The fuel cell of any of embodiments 5-7, wherein the cathode layer is configured to output the cathode process gas in a direction substantially parallel to the second direction.

Embodiment 9. The fuel cell of any of embodiments 5-8, wherein the anode layer includes a first diverting surface configured to receive the anode process gas in the first direction and redirect the anode process gas toward the first extended edge seal chamber.

Embodiment 10. The fuel cell of any of embodiments 5-9, wherein the anode layer includes a second diverting surface configured to receive the anode process gas from the second extended edge seal chamber and redirect the anode process gas in the first direction.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, use of materials, colors, orientations, manufacturing processes, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A fuel cell, comprising:
    a cathode comprising a cathode inlet located on a cathode inlet side of the fuel cell, a cathode active area, and a cathode outlet located on a cathode outlet side of the fuel cell, wherein the cathode outlet side and the cathode inlet side are opposite sides of the fuel cell;
    an anode comprising an anode inlet located on an anode inlet side of the fuel cell, an extended edge seal input chamber, and an anode active area, wherein the anode inlet side is different from both the cathode inlet side and the cathode outlet side, wherein the extended edge seal input chamber is located outside of the anode and cantilevered over the cathode inlet on the cathode inlet side, and wherein the extended edge seal input chamber is in fluid communication with the anode inlet and an anode active area inlet, wherein the anode active area inlet is located on the cathode inlet side or the cathode outlet side;
    an electrolyte matrix layer separating the anode and the cathode; and
    wherein the extended edge seal input chamber is configured to allow an anode process gas and a cathode process gas to pass across the anode active area inlet and the cathode inlet in substantially parallel flow paths.

2. A fuel cell stack comprising:
    a cathode input manifold adjacent to a cathode inlet side of the fuel cell stack;
    an anode input manifold adjacent to an anode inlet side of the fuel cell stack that is different from the cathode inlet side;
    a cathode output manifold adjacent to a cathode outlet side of the fuel cell stack that is different from the cathode inlet side and the anode inlet side;
    a fuel cell comprising:
    an anode comprising an anode inlet located on the anode inlet side of the fuel cell stack, an extended edge seal input chamber, and an anode active area, the anode inlet being in fluid communication with the anode input manifold and the extended edge seal input chamber, the extended edge seal input chamber being located outside of the anode active area and cantilevered over a cathode inlet on the cathode inlet side, and the extended edge seal input chamber being in fluid communication with the anode inlet and the anode active area through an anode active area inlet, wherein the anode active area inlet is located on the cathode inlet side or the cathode outlet side;
    a cathode comprising a cathode inlet and a cathode active area; and
    an electrolyte matrix layer separating the anode and the cathode.

3. The fuel cell stack of claim 2, wherein the extended edge seal input chamber is configured to allow an anode process gas and a cathode process gas to pass into the anode and the cathode in substantially parallel flow paths.

4. The fuel cell stack of claim 3, wherein the anode includes a diverting surface configured to receive anode process gas and divert the anode process gas into the extended edge seal input chamber.

5. A fuel cell used in a fuel cell stack comprising:
    an anode layer having an anode active area configured to receive anode process gas through an anode active area inlet and output the anode process gas through an anode outlet;
    a cathode layer configured to receive cathode process gas from a cathode inlet on a cathode inlet side of the fuel cell and output cathode process gas to a cathode outlet located on a cathode outlet side of the fuel cell, wherein the cathode outlet side is opposite of the cathode inlet side; and
    an electrolyte matrix layer separating the anode layer and the cathode layer,
    wherein the anode layer includes a first extended edge seal input chamber, wherein the first extended edge seal input chamber is a cantilevered protrusion located outside of the anode active area and extending away from the anode active area on the cathode inlet side or the cathode outlet side;
    wherein the first extended edge seal input chamber is configured to receive the anode process gas provided to the fuel cell stack from an anode inlet side of the fuel cell that is different from the cathode inlet side and the cathode outlet side and output the anode process gas across an anode active area inlet located on the cathode inlet side or the cathode outlet side.

6. The fuel cell of claim 5, wherein the fuel cell further comprises:
    a second extended edge seal chamber extending away from the anode active area on a side opposite the first extended edge seal input chamber,
    wherein the second extended edge seal chamber is configured to receive the anode process gas from the anode active area.

7. The fuel cell of claim 5, wherein the cathode layer is configured to receive the cathode process gas in a direction substantially parallel to a direction the anode process gas flows through across the anode active area inlet into the anode active area.

8. The fuel cell of claim 5, wherein the cathode layer is configured to output the cathode process gas in a direction substantially parallel to the direction the anode process gas flows through the anode active area.

9. The fuel cell of claim 5, wherein the anode layer includes a first diverting surface configured to receive the anode process gas from the anode inlet side and redirect the anode process gas toward the first extended edge seal input chamber.

10. The fuel cell of claim 5, wherein the anode layer includes a second diverting surface configured to receive the anode process gas from a second extended edge seal chamber and redirect the anode process gas to an anode outlet side of the fuel cell, wherein the anode outlet side is opposite the anode inlet side.

* * * * *